US012071794B2

(12) United States Patent
Anderson et al.

(10) Patent No.: US 12,071,794 B2
(45) Date of Patent: Aug. 27, 2024

(54) DOOR LOCK SYSTEM AND METHOD

(71) Applicant: Transportation IP Holdings, LLC, Norwalk, CT (US)

(72) Inventors: John D. Anderson, Oswego, IL (US); Walter J. Peach, Montgomery, IL (US)

(73) Assignee: Transportation IP Holdings, LLC, Norwalk, CT (US)

( * ) Notice: Subject to any disclaimer, the term of this patent is extended or adjusted under 35 U.S.C. 154(b) by 105 days.

(21) Appl. No.: 17/714,380

(22) Filed: Apr. 6, 2022

(65) Prior Publication Data

US 2022/0341230 A1 Oct. 27, 2022

Related U.S. Application Data

(60) Provisional application No. 63/180,559, filed on Apr. 27, 2021.

(51) Int. Cl.

*E05C 5/04* (2006.01)
*E05B 57/00* (2006.01)
*E05B 83/10* (2014.01)

(52) U.S. Cl.

CPC ................ *E05C 5/04* (2013.01); *E05B 57/00* (2013.01); *E05B 83/10* (2013.01)

(58) Field of Classification Search

CPC ..... E05C 5/04; E05C 5/00; E05C 5/02; E05B 57/00; E05B 83/02; E05B 35/008; E05B 19/0017; E05B 65/0888; E05B 65/467; E05B 83/08; E05B 83/10; B61D 19/001; B61D 19/004; Y10T 292/20; Y10T 292/218; Y10T 292/221; Y10T 292/223

See application file for complete search history.

(56) References Cited

U.S. PATENT DOCUMENTS 649,916 A * 5/1900 Dietrich .................. F16L 33/04 24/279
2,677,164 A * 5/1954 Stade ...................... F16L 33/04 24/279
2,752,187 A * 6/1956 Gordon ................. E05B 65/006 292/256.75
2,837,383 A * 6/1958 Skelly ..................... F16C 33/08 29/521
4,010,788 A * 3/1977 Van Gompel ......... G09F 3/0364 411/953
4,099,754 A * 7/1978 Hoebing ................... E05C 5/04 292/206

(Continued)

*Primary Examiner* — Christine M Mills
*Assistant Examiner* — Faria F Ahmad
(74) *Attorney, Agent, or Firm* — K&L Gates LLP

(57) ABSTRACT

A door lock system and method includes a first latch member defining a threaded aperture and configured for attachment to a first door member, a second latch member having a slot and configured for attachment to a second door member, and a clamp member having an elongate shaft, a flange attached to a first end of the shaft, and a threaded, second end configured to be screwed into the threaded aperture; one end of the shaft defines a tool aperture. An end region adjacent the first end of the shaft is configured to be disposed through the slot. When a tool is used to rotate the shaft relative to the threaded aperture to move the flange towards the second latch member, the flange comes into abutment with the second latch member to connect the shaft and latch members together for securing the door members.

20 Claims, 19 Drawing Sheets

(56) References Cited

U.S. PATENT DOCUMENTS

| | | | | | |
|---|---|---|---|---|---|
| 4,193,173 | A * | 3/1980 | Lorenz | F16B 2/10 | 24/457 |
| 4,461,502 | A * | 7/1984 | Burgess | E05B 65/0888 | 292/262 |
| 4,837,557 | A * | 6/1989 | Striebel | G08B 13/08 | 200/61.71 |
| 4,895,471 | A * | 1/1990 | Geltz | F16B 7/14 | 403/109.8 |
| 4,979,769 | A * | 12/1990 | Salyer | E05C 19/004 | 292/DIG. 60 |
| 5,303,832 | A * | 4/1994 | Tu | A47G 25/0692 | 211/105.4 |
| 5,462,249 | A * | 10/1995 | Calzone | B60P 1/43 | 292/256.73 |
| 5,873,611 | A * | 2/1999 | Munley | F16L 23/10 | 285/410 |
| 6,325,277 | B1 * | 12/2001 | Collie | B23K 9/0286 | 228/44.3 |
| 6,871,884 | B2 | 3/2005 | Hoffmann et al. | | |
| 7,384,078 | B2 * | 6/2008 | Cobb | F16B 2/10 | 285/410 |
| 7,883,121 | B2 * | 2/2011 | Henry | F16L 23/10 | 285/410 |
| 8,011,213 | B1 * | 9/2011 | Gogel | E05B 83/10 | 292/259 R |
| 8,864,195 | B2 * | 10/2014 | Sullivan | E05B 65/0888 | 292/DIG. 60 |
| 9,032,592 | B2 * | 5/2015 | Fritskey | F16L 33/04 | 285/410 |
| 9,416,569 | B1 * | 8/2016 | Leone | E05B 41/00 | |
| 10,196,939 | B2 | 2/2019 | Schule et al. | | |
| 10,641,006 | B1 * | 5/2020 | Haile | E05B 1/0053 | |
| 2007/0284324 | A1 * | 12/2007 | Goldstein | A47H 1/102 | 211/105.3 |
| 2008/0277922 | A1 * | 11/2008 | Ghidini | F16L 37/101 | 285/34 |
| 2009/0236864 | A1 * | 9/2009 | Ehrlich | E05B 9/08 | 292/217 |
| 2010/0038926 | A1 * | 2/2010 | Williamson | B60P 7/04 | 74/504 |
| 2012/0111069 | A1 * | 5/2012 | Padjen | E05C 5/04 | 70/91 |
| 2017/0241166 | A1 * | 8/2017 | Cheng | E05C 7/04 | |
| 2018/0202201 | A1 | 7/2018 | Cencer | | |
| 2018/0298651 | A1 | 10/2018 | Cencer | | |
| 2020/0063469 | A1 * | 2/2020 | Zaerr | E05B 13/002 | |
| 2020/0115934 | A1 * | 4/2020 | Dolnik | E05B 77/16 | |
| 2023/0279704 | A1 * | 9/2023 | Shankool | E05C 19/005 | 292/259 R |

* cited by examiner

DOOR LOCK SYSTEM AND METHOD

CROSS-REFERENCE TO RELATED APPLICATIONS

This application claims priority to U.S. Provisional Application No. 63/180,559 (filed 27 Apr. 2021), the entire disclosure of which is incorporated herein by reference.

BACKGROUND

Technical Field

Embodiments of the subject matter described herein relate to door locks for vehicles. Other embodiments relate to external clamp locks for cargo vehicles.

Discussion of Art

Some rail cars and other cargo vehicles include door panels for accessing an interior cargo space of the vehicle. To avoid theft and vandalism, the door panels may be secured to prevent unauthorized access. However, many cargo vehicles lack internal or "built in" door locking mechanisms. Such vehicles can be provided with devices like hasps and padlocks, but keyed locks are impractical for cargo vehicles that cross jurisdictional borders and/or that need to be accessed by different operational entities in different geographic locations. For example, for vehicles that carry cargo between states, countries, other otherwise across large distances, padlocking the door panels closed is impractical since it is difficult to ensure that personnel at the point of unlading (removing the cargo) will have the same key or keys. Also, cutting off padlocks is time consuming, expensive, and potentially damaging to the vehicle.

Therefore, it may be desirable to provide a vehicle door lock system that differs from existing vehicle door locks.

BRIEF DESCRIPTION

In accordance with one example or aspect, a door lock system (e.g., for rail vehicles or other vehicles) includes a first latch assembly, a second latch assembly, and a clamp member. The first latch assembly includes a first latch member defining a threaded aperture and configured for pivotal attachment to a first door member. The second latch assembly includes a second latch member having a side slot extending therethrough and configured for attachment to a second door member. The clamp member has an elongate shaft with a first end and a second end. A first flange is attached to the first end, and the second end is threaded for screwing into the threaded aperture of the first latch member. An end region of the shaft adjacent the first end is configured to be disposed through the side slot of the second latch member. The first end or the second end of the shaft defines a tool aperture (e.g., a tamper-resistant tool aperture) configured to receive a tool head for rotation of the shaft. When the end region is received in the side slot and the shaft is rotated to screw the second end of the shaft into (e.g., further into) the threaded aperture, the first flange moves towards the second latch member and comes into abutment with the second latch member. This connects the shaft, the first latch member, and the second latch member together, for securing the first door member with the second door member.

In accordance with one example or aspect, a door lock system (e.g., for rail vehicles or other vehicles) includes a first latch assembly, a second latch assembly, and a clamp member. The first latch assembly includes a first latch member defining a threaded aperture and configured for pivotal attachment to a first door member. The second latch assembly includes a second latch member having a side slot and configured for attachment to a second door member. The clamp member includes an elongate shaft and a first flange attached to a first end of the shaft. The shaft has a threaded, second end operably threadedly disposed in the threaded aperture of the first latch member. The first end or the second end of the shaft defines a tool aperture (e.g., a tamper-resistant tool aperture) configured to receive a tool head for rotation of the shaft. An end region adjacent the first end of the shaft is configured to be received in the side slot of the second latch member when the first latch member is pivoted to bring the shaft and second latch member into engagement. The first flange is configured, when the end region is received in the side slot and the shaft is rotated to screw the second end of the shaft further into the threaded aperture, to move towards and come into abutment with the second latch member. Thereby, the shaft, the first latch member, and the second latch member are connected together for securing the first door member with the second door member.

BRIEF DESCRIPTION OF THE DRAWINGS

The inventive subject matter may be understood from reading the following description of non-limiting embodiments, with reference to the attached drawings, wherein below.

DETAILED DESCRIPTION

Figure 1:
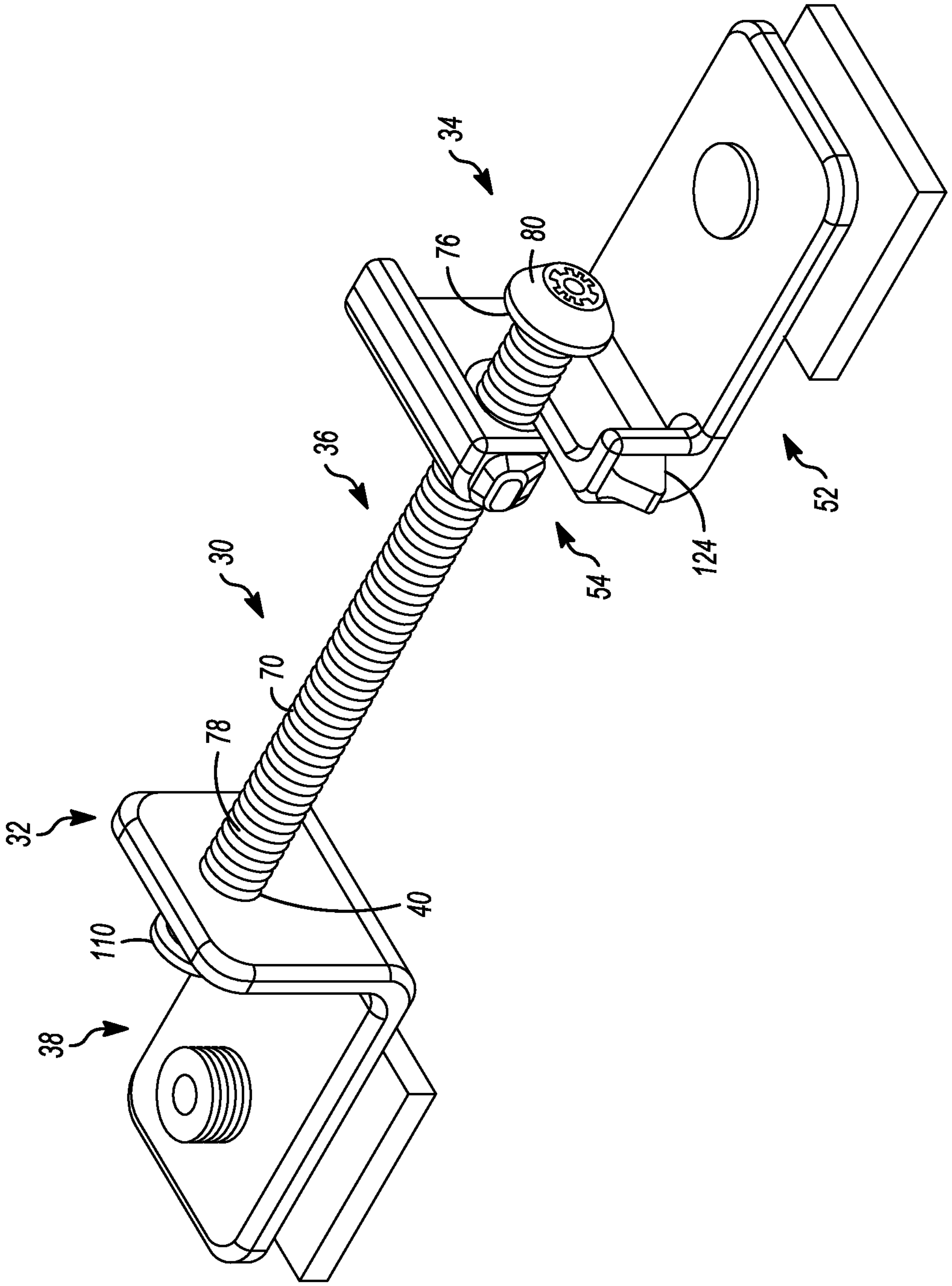
FIG. 1 illustrates a first embodiment of a door lock system.
Figure 2:
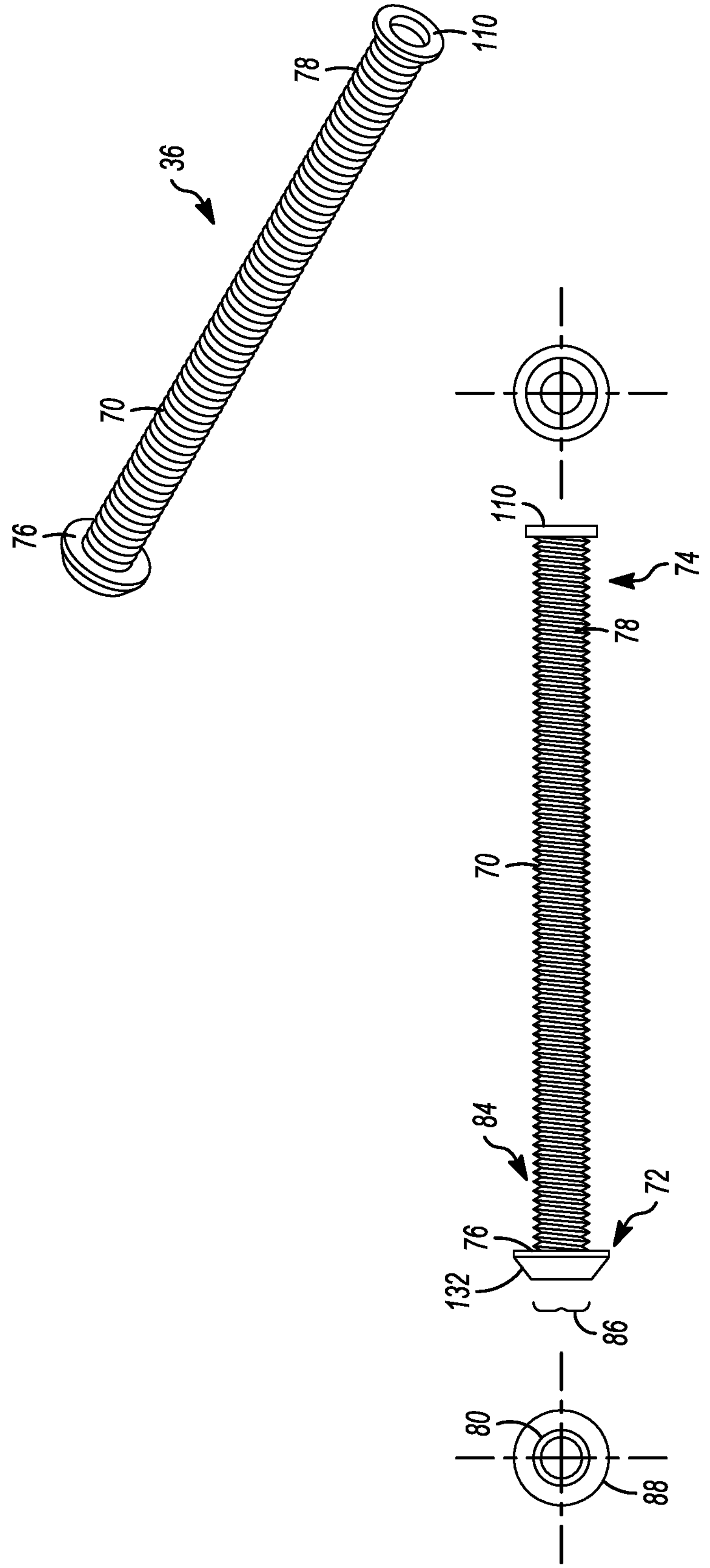
FIG. 2 illustrates an embodiment of a clamp member.

Embodiments of the subject matter described herein relate to door lock systems, such as may be used to retrofit or otherwise equip autoracks (car carriers), other rail cars, and other cargo vehicles for externally securing access doors without the need for padlocks or other keyed locks that require coordinated control of keysets. In one embodiment, the system includes a first latch assembly, a second latch assembly, and a clamp member. The first latch assembly includes a first latch member defining a threaded aperture and configured for attachment to a first door member. (As used herein, "door member" refers to any part of a door, e.g., door panels, parts that provide support for a door, e.g., door frames, and parts that otherwise serve to establish a door function for selectively accessing an interior cargo space or other space, e.g., vehicle frame parts that abut a door when the door is closed but are not directly connected to the door.) The second latch assembly includes a second latch member having a slot extending therethrough and configured for attachment to a second door member. The clamp member includes an elongate shaft with first and second ends and a first flange attached to the first end. The second end is threaded for screwing into the threaded aperture of the first latch member. The first end or the second end of the shaft defines a tool aperture (e.g., a tamper-resistant tool aperture) configured to receive a tool head for rotation of the shaft. An end region adjacent the first end of the shaft is configured to be disposed through the slot of the second latch member. The first flange is configured, when the end region is disposed through the side slot and the shaft is rotated (e.g., with a tool positioned in the tool aperture) to screw the second end of the shaft into the threaded aperture, to move towards and come into abutment with the second latch member. This connects the two latch members together, for securing the first door member with the second door member.

In embodiments, the first latch member may be configured for pivotal attachment to the first door member. The threaded, second end of the shaft may be threadedly disposed in the threaded aperture of the first latch member, and can pivot (relative to the door member) along with the first latch assembly. The slot of the second latch member is provided as a side slot, e.g., it may extend through the second latch member both from front to back and through to a side of the second latch member. The end region adjacent the first end of the shaft is configured to be received in the side slot when the first latch member is pivoted to bring the shaft and second latch member into engagement. When the end region is received in the side slot and the shaft is rotated to screw the second end of the shaft further into the threaded aperture, the flange moves towards and come into abutment with the second latch member. Thereby, in effect, the two latch members are rigidly clamped together through the shaft, for securing the first door member with the second door member.

In other embodiments, the first and second latch members are fixedly attached to the door members. The slot of the second latch member is provided as a through-hole, and the shaft of the clamp member is disposed through the through-hole, with the threaded, second end facing the first latch member. (As part of the manufacturing process, after the shaft is disposed through the through-hole, it may be outfitted with a second, intermediate flange to prevent it from being removed from the second latch member in the field.) In operation, to secure the two door members together, the shaft is moved towards the first latch member and a tool is used to rotate the shaft to screw the threaded end of the shaft into the threaded aperture; the shaft and first flange are positioned/dimensioned so that the flange comes into abutment with the second latch member once the threaded end of the shaft is screwed into the first latch member.

Turning now to the figures, FIGS. 1-13 show aspects of embodiments of a door lock system 30. The door lock system includes a first latch assembly 32, a second latch assembly 34, and a clamp member 36. The first latch assembly includes a first latch member 38 defining a threaded aperture 40 and configured for pivotal attachment to a first door member 42. The first latch member may be provided as, for example, a first L-bracket 44 having a first base plate 46 and a bracket leg or a first clamp plate 48 attached at a right angle to one side edge of the first base. The first base plate defines a pivot connection hole 50, e.g., the hole may be formed in the base by drilling or another machining operation. The first clamp plate defines the threaded aperture, e.g., the threaded aperture may be tapped in the bracket leg using standard machining techniques, or the threaded aperture may be provided by permanently affixing a nut or other pre-threaded element as part of the bracket leg, in alignment with an un-threaded hole extending through an adjacent portion of the bracket leg body. The second latch assembly includes a second latch member 52 having a side slot 54 and configured for attachment to a second door member 56. The second latch member may be provided as, for example, as a second L-bracket 58, such as an L-bracket receiver having a second bracket base plate 60 and a receiver member or a second clamp plate 62 attached at a right angle to one side edge of the second base. The second base plate defines a connection hole 64, e.g., the hole may be formed in the base by drilling or another machining operation. The second clamp plate defines the side slot 54, e.g., the side slot may be formed in the receiver member by machining. The side slot extends through the second clamp plate from front to back, and is also open to one side of the second clamp plate, e.g., the slot extends from an interior area of the second clamp plate through to an opening in the side of the second clamp plate. The side slot is generally elongate, having a long axis 66 that is parallel to a plane of the second base plate and a height 68, which may be shorter than a length of the long axis.

The clamp member 36 includes an elongate shaft 70 having a first end 72 and a second end 74. A first flange 76 is attached to the first end, and the second end is provided with threads 78 that are complementary to the threaded aperture of the first latch member, for the second end of the shaft to be operably threadedly disposed in (i.e., screwed into) the threaded aperture. (In addition to the second end of the shaft being threaded, optionally, the entirety of the shaft may be threaded.) The first end or the second end of the shaft defines a tool aperture 80 configured to receive a tool head 82 (see FIG. 11) for rotation of the shaft; in the embodiment shown in the drawings, the first end of the shaft defines the tool aperture. An end region 84 of the shaft adjacent to the first end of the shaft is sized to fit in the side slot, e.g., a diameter 86 of the shaft may be smaller than the height 68 of the side slot. The first flange has a diameter 88 (widest cross dimension) that is greater than the diameter of the shaft and greater than the height of the side slot.

For installation, e.g., onboard a vehicle, the first latch member 38 is pivotally attached to the first door member 42. For this purpose, in embodiments, the first latch assembly 32 may also include one or more first backer plates 90 (also referred to as spacer plates), for alignment of the first and second latch members despite the door members being uneven or misaligned. Each backer plate is a generally square or otherwise rectangular plate that generally corresponds in size to the base 46 of the first latch member, and which defines a backer plate connection hole 92. The first latch assembly 32 also includes a first fastener unit 94. In the illustrated embodiment, the first fastener unit is a pivot connector assembly having a first fastener 96 and a retaining element 98. For example, the first fastener may be a shoulder bolt 100 (see FIG. 9), a hex head cap screw 102 (see FIG. 13), or the like; the retaining element may be a nut 104 (see FIGS. 8 and 13), such as a lock nut. For attachment, the door member is provided with a hole (e.g., using a drill) having a diameter large enough to accommodate a shaft portion of the first fastener 96 but small enough to prevent passage of the retaining element and/or a head portion of the fastener. The first latch member and the backer plate are placed against one another, and the shaft of the fastener is passed through the pivot connection hole of the first latch member and through the connection hole of the backer plate. The backer plate is placed against the door member, with the shaft of the fastener extending through the hole provided in the door member. On an inner side of the door member opposite the first latch member, the retaining element is threaded onto the fastener and tightened into place against the door member, thereby affixing the assembly to the door member. (Optionally, backer plates may be disposed on both the interior and exterior door surfaces, such that the door member is sandwiched between the two, to provide a clamp-like connection having a greater area of surface contact between the assembly and door.) Washers 106 (see the embodiment of FIG. 13 as an example) may be provided on both sides (e.g., between the retaining element and inner side of the door member, and between the fastener head and first latch member), and/or a thread locking compound may be applied to threads of the fastener and/or retaining element, to enhance the mechanical connection.

(Parts and methods for attachment and assembly as described herein are provided as examples, and it may be possible to attach or assemble components using other attachment parts, means, methods, and/or in a different order of steps or with fewer or more steps. For example, for a fixed connection, welding or adhesives may be used instead of, or in addition to, fasteners.)

Figure 13:
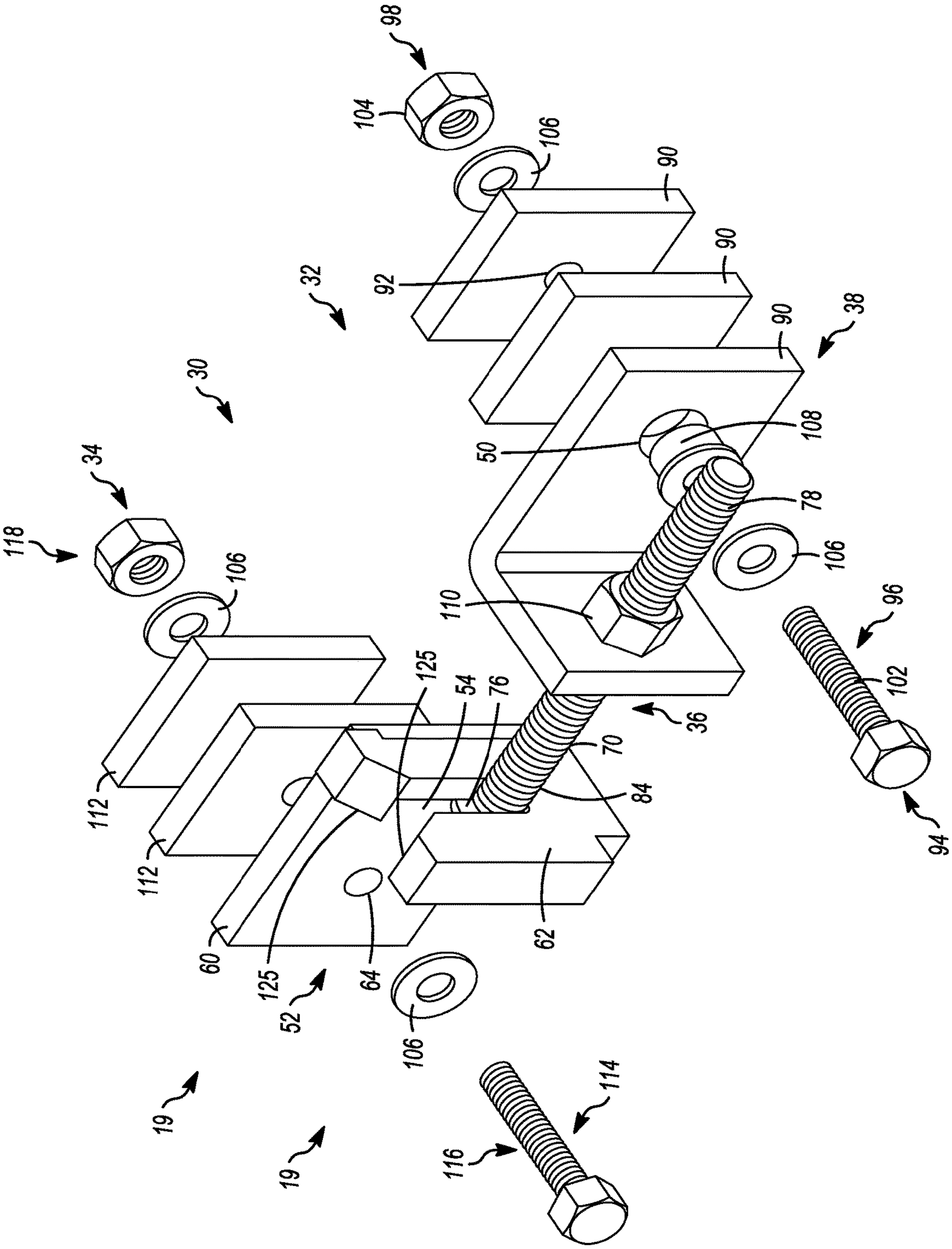
FIG. 13 illustrates an exploded view of the door lock system shown in FIG. 1.

In other embodiments, with reference to FIG. 13, the pivot connector assembly 94 of the first latch assembly may also include a collar or bushing 108. The collar or bushing has an outer diameter, and a fastener through-hole that defines an inner diameter of the collar or bushing. The outer diameter is complementary to a diameter of the pivot connection hole 50 of the first latch member, such that the collar or bushing can be press fit or otherwise disposed in the pivot connection hole. The inner diameter is slightly larger than the diameter of a shaft of the first fastener, for the first latch member to be pivotal about the fastener as opposed to a tight, stationary connection. In this embodiment, for attachment, the collar or bushing is disposed in the pivot connection hole, and the shaft of the fastener is passed through the collar or bushing and thereby through the first latch member. The first latch member is placed against the door member, with the shaft of the fastener extending through the hole provided in the door member. The retaining element is threaded onto the fastener and tightened into place, as described above.

Optionally, as shown in FIG. 13, the assembly may be provided with the one or more first backer plates 90, for example, if the door members are misaligned, and/or if there is a need or desire to provide a pivoting surface on the outside of the door which is the door member itself, e.g., to avoid scratching the door member. After attachment, the one or more first backer plates 90 directly or indirectly abut the door member, i.e., they are interposed between the door member and the first latch member, to provide a support and pivoting surface. One or multiple backer plates on the latch member side of the door member may be used to accommodate situations where the door members are not co-planar or otherwise offset or misaligned, e.g., due to age, damage, manufacturing variances, etc. Also, as noted above, backer plates may be disposed on both the inner and outer side surfaces of the door member. If backer plates are not used, the collar or bushing would come into contact with the door member when the assembly is tightened into place.

Before or after attaching the first latch member to the first door member, the second end of the shaft of the clamp member is screwed into the threaded aperture of the first latch member, far enough for the second end to protrude out the back of the aperture. After doing so, in embodiments, a second flange 110 may be attached to the second end of the shaft. The second flange has a diameter (or other widest cross-dimension) that is larger than the diameters of the shaft and threaded aperture. The second flange may include, for example, a washer, a nut, a C- or E-clip or other clip, a cotter pin, or the like. The second flange may be secured in place, using, for example, welding, an adhesive, a thread locking compound, a mechanical connection, or the like. In conjunction with the first flange, the second flange may prevent the shaft from being easily removed from the threaded aperture, to reduce instances of loss or misplacement in the field. The second flange may be positioned at the second end of the shaft, or towards the second end (closer to the second end than the first end).

Figure 6:
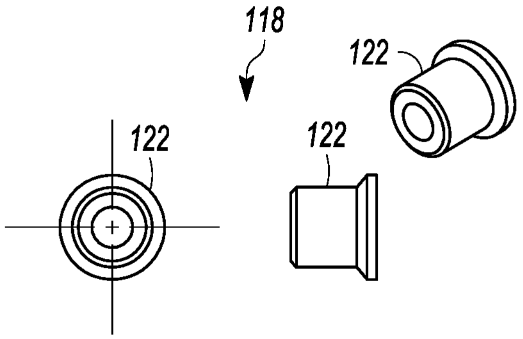
FIG. 6 illustrates an embodiment of a retaining element.
Figure 7:
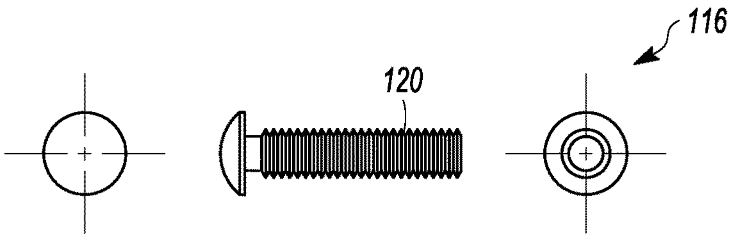
FIG. 7 illustrates an embodiment of a fastener.
Figure 8:
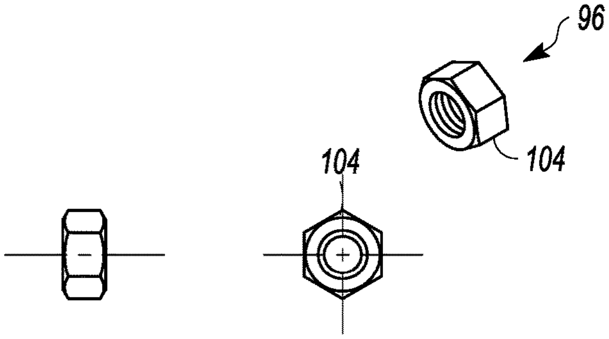
FIG. 8 illustrates an embodiment of another retaining element.
Figure 9:
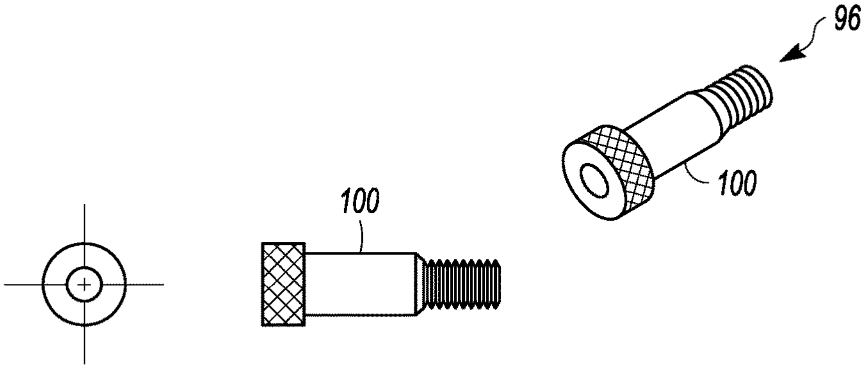
FIG. 9 illustrates an embodiment of another fastener.

For completing installation of the door locking system, the second latch member 52 is fixedly attached to the second door member 56. For this purpose, in embodiments, the second latch assembly 34 may optionally include one or more second backer plates (spacer plates) 112 and a second fastener unit 114 (e.g., a fixed connector assembly) having a second fastener 116 and a second retaining element 118. For example, as shown in FIG. 13, the second fastener may be a bolt, a hex head cap screw, or the like, and the retaining element may be a nut, such as a lock nut. Alternatively, as shown in FIGS. 6 and 7, the second fastener may be a rivet 120 and the second retaining element may be a rivet locking collar 122. The one or more second backer plates 112 are provided for the second latch member to be generally coplanar and aligned with the first latch member; the latch assemblies may have different numbers of backing plates for alignment of the latch members despite the door members being misaligned. (Optionally, backer plates may be provided on both sides of the door member, with the door member sandwiched therebetween.) For attaching the second latch member, the second door member is provided with a hole (e.g., using a drill), the second latch member and backer plate(s) (if used) are aligned with the hole, and the second fastener is passed through the aligned holes and, after the backer plate(s)(if used) is in place, tightly secured in place with the second retaining element. Prior to providing the hole in the second door member, measurements are taken, based on the positioning of the first latch assembly and the length of the clamp member, for the hole in the second door member and the second latch member to be positioned so that when the first latch member and clamp member are pivoted the shaft end region of the clamp member will be received in the side slot.

Figure 10:
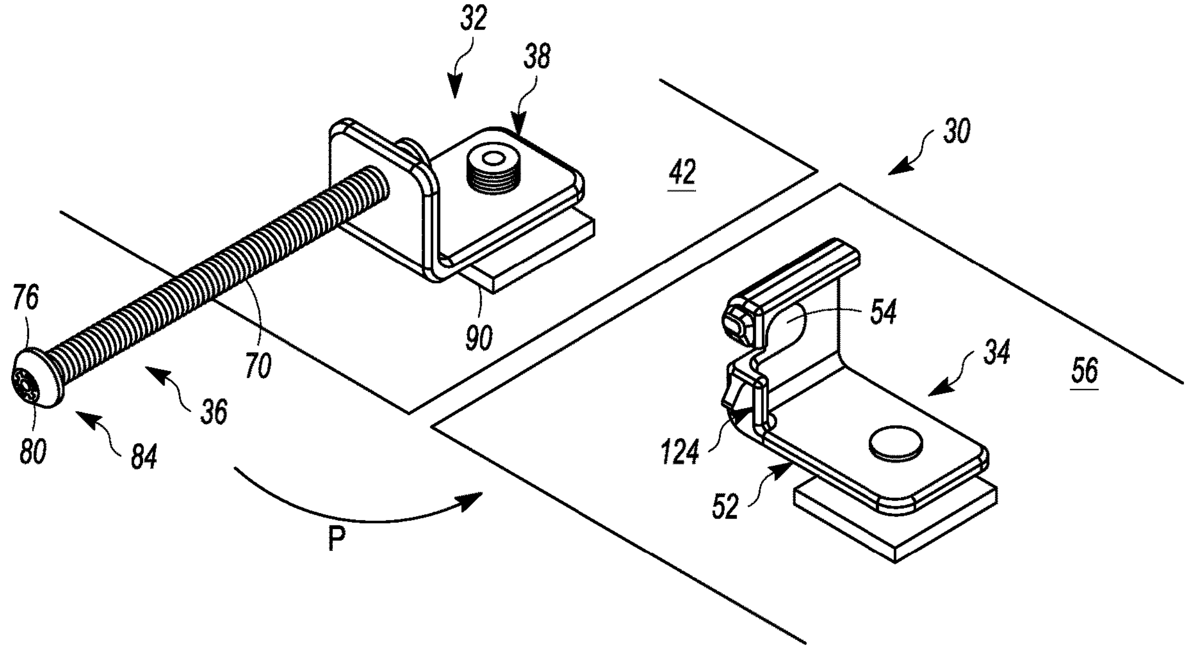
FIG. 10 illustrates the door lock system of FIG. 1 in a first, unlocked operative state.
Figure 11:
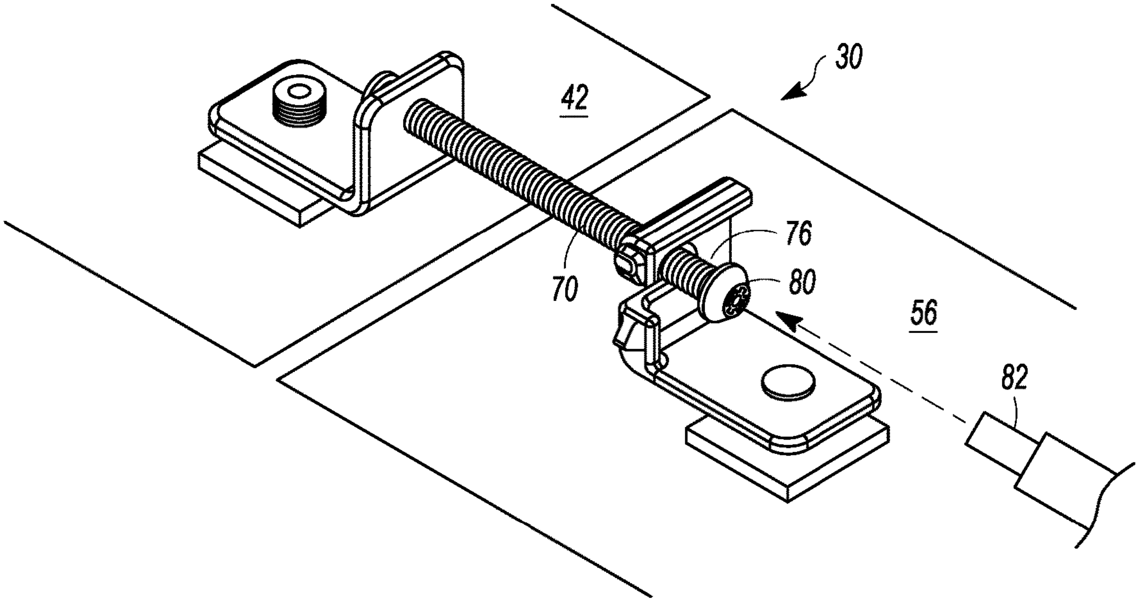
FIG. 11 illustrates the door lock system in a second, intermediate operative state.
Figure 12:
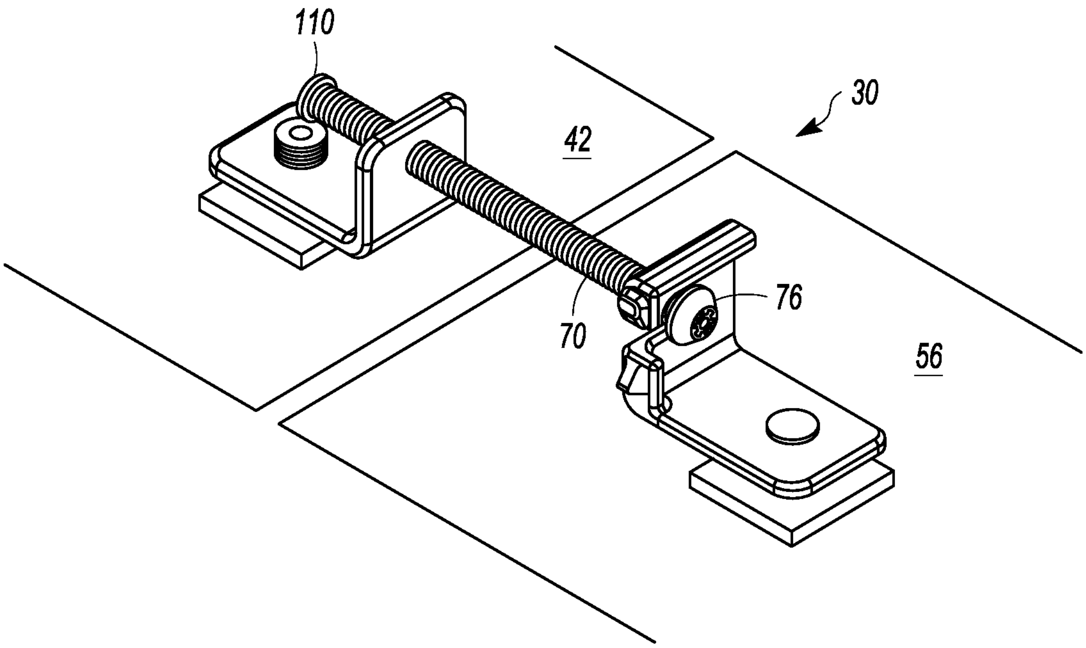
FIG. 12 illustrates the door lock system in a third, locked operative state.

In operation, first with reference to FIG. 10, the first latch member 38 and the clamp member 36 are pivoted in the direction of arrow "P" towards the side of the second latch member 52 having the opening of the side slot 54. (If needed, the clamp member is first screwed/rotated relative to the first latch member for the first flange 76 and shaft to extend far enough out from the first latch member so that when the clamp member is pivoted, the end region 84 of the shaft will be received in the side slot and the first flange 76 will not hit the second latch member to prevent the shaft end region from entering the side slot.) As shown in FIG. 11, the first latch member 38 and the clamp member 36 are pivoted far enough for the end region 84 of the shaft to be received in the side slot 54. Then, a tool head 82 is moved to engage the tool aperture 80, and used to rotate the shaft to cause the threaded end of the shaft to screw into the threaded aperture of the first latch member, in a direction that causes the first flange to move towards the second latch member. As shown in FIG. 12, the first flange 76 comes into abutment with the side surface of the second latch member, and is tightened into place. The clamp member thereby connects the first and second latch members together, preventing the door members from being opened. To unlock the door members, the tool head is engaged with the tool aperture and used to rotate the clamp member shaft in a direction that causes the first flange to disengage from the second latch member. The clamp member can then be pivoted to remove it from the second latch member, back to the unlocked operative state as shown in FIG. 10.

As noted above, the end region of the shaft adjacent to the first end of the shaft is sized to fit in the side slot. The first flange has a diameter that is greater than the diameter (or other lateral cross-dimension) of the shaft and greater than the height of the side slot. Thereby, the end region is configured to be received in the side slot of the second latch member when the first latch member is pivoted or swung to bring the shaft and second latch member into engagement, and the first flange is configured, when the end region is received in the side slot and the shaft is rotated to move the first flange towards the second latch member, to come into abutment with the second latch member for a locking connection.

Figure 3:
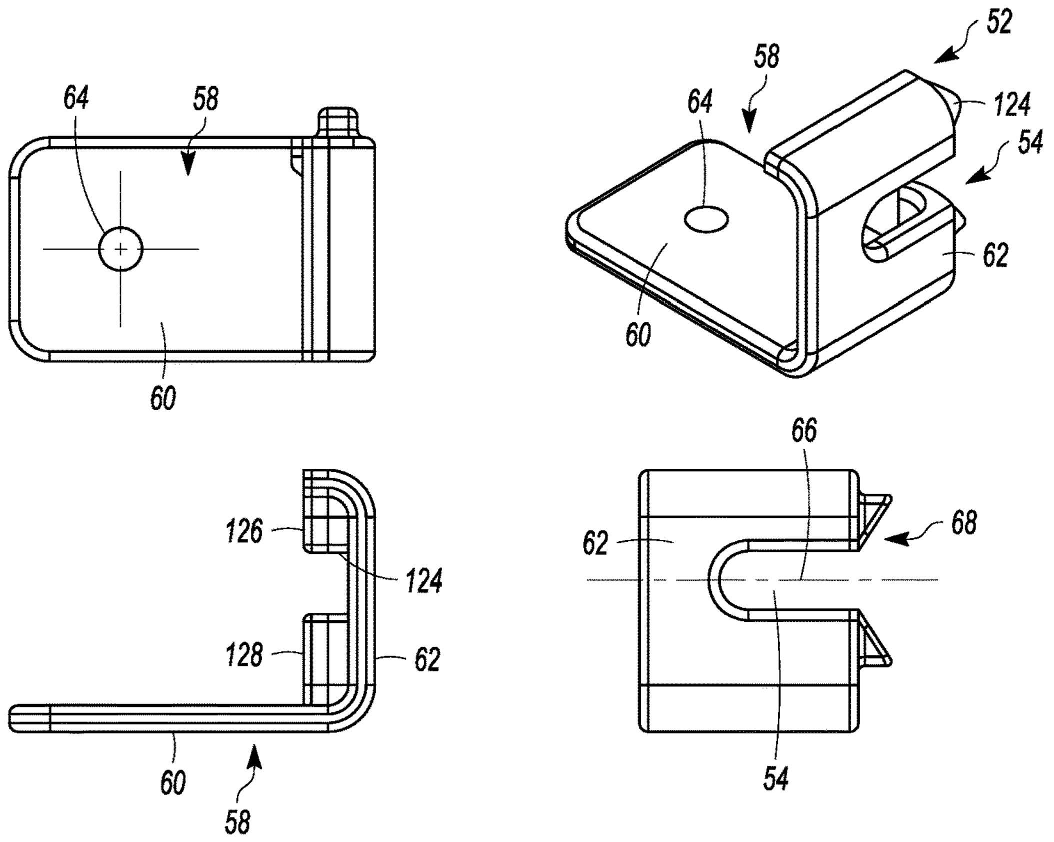
FIG. 3 illustrates an embodiment of a second latch member.
Figure 4:
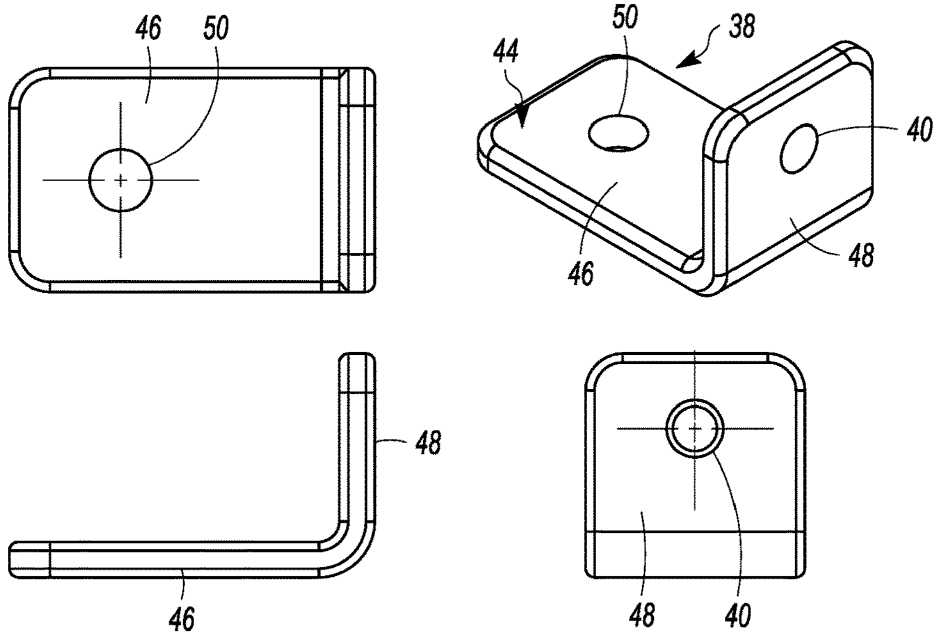
FIG. 4 illustrates an embodiment of a first latch member.
Figure 5:
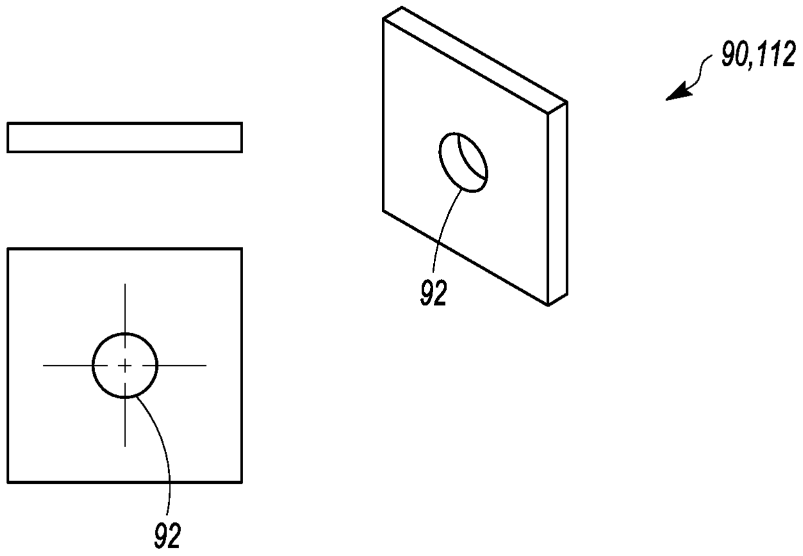
FIG. 5 illustrates an embodiment of a backer plate.
Figure 20:
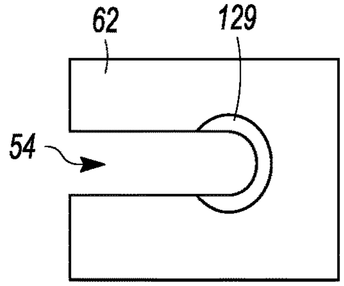
FIG. 20 illustrates another embodiment of a receiver member.

In embodiments, the second latch member may also include at least one lip 124 positioned adjacent the side opening of the side slot and defining a clearance dimensioned to interfere with the first flange, to prevent the clamp member shaft from being slidably removed from the side slot, when the first flange abuts the second latch member. For example, as shown in FIG. 3, there may be a first lip tab 126 attached to a receiver member (e.g., the second clamp plate 62 of the second L-bracket) at a right angle, and positioned on one side of the side slot opening, and a second lip tab 128 attached to the receiver member also at a right angle and positioned on the other side of the side slot opening. The lip tabs 126, 128 thereby define an opening that corresponds to the height of the slide slot, but which is narrower than the diameter of the first flange 76 of the clamp member. When the clamp member is screwed far enough inwards for the first flange to be adjacent to the side of the second latch member, it lies recessed relative to the lip tabs. Here, attempting to pivot the clamp member out of the side slot (e.g., if the clamp member is not fully tightened) results in the first flange hitting the lip tabs, preventing the clamp member from being removed from the side slot. Instead, the clamp member must be unscrewed to a sufficient extent for the first flange to clear the lip tabs when the clamp member is pivoted. (In another embodiment, with reference to FIG. 20, the lip may be defined by a counter-bore 129 in the receiver member, partially concentric around the innermost end of the slot 54, which is dimensioned to receive the first flange.) Thereby, the lip(s) 124 may prevent unauthorized persons from applying a sharp force to the clamp member shaft as might cause the shaft to come dislodged from the second latch member even with the first flange tightened against the second latch member, if the lips were not present.

Figure 19:
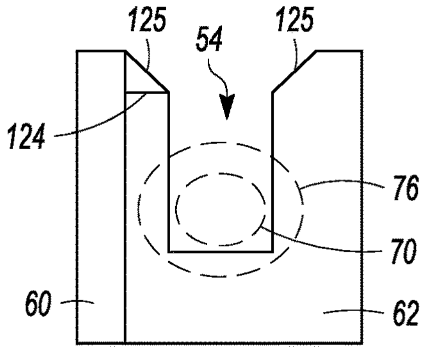
FIG. 19 illustrates an embodiment of a receiver member with a lead-in, corresponding to the view of line 19-19 in FIG. 13.

Optionally, with reference to FIGS. 13 and 19, the receiver member of the second latch member may be provided with a lead-in 125. The lead-in includes at least one surface on the receiver member, positioned adjacent to the open end of the slot, which is angled relative to a side surface of the slot, so that the opening of the slot is wider than the diameter of the clamp member shaft. In other words, by way of the lead-in, the inner portion of the slot is just slightly larger than the shaft diameter, whereas the opening to the slot, which transitions to the inner portion of the slot by way of the angled surface(s) of the lead-in, is wider than the shaft diameter (e.g., twice as wide). Thereby, if the shaft and slot become slightly misaligned over time, e.g., due to vibration or door misalignment, the shaft, instead of hitting the leading edge of the receiver member and not entering the slot, will encounter the lead-in and slide along the angled surface(s) for being guided into the slot inner portion. The lead-in may also establish the one or more lips 124, by extending the portion(s) of the receiver member that define the angled surface(s) out past a thickness of the main body around the perimeter slot inner portion.

Figure 14:
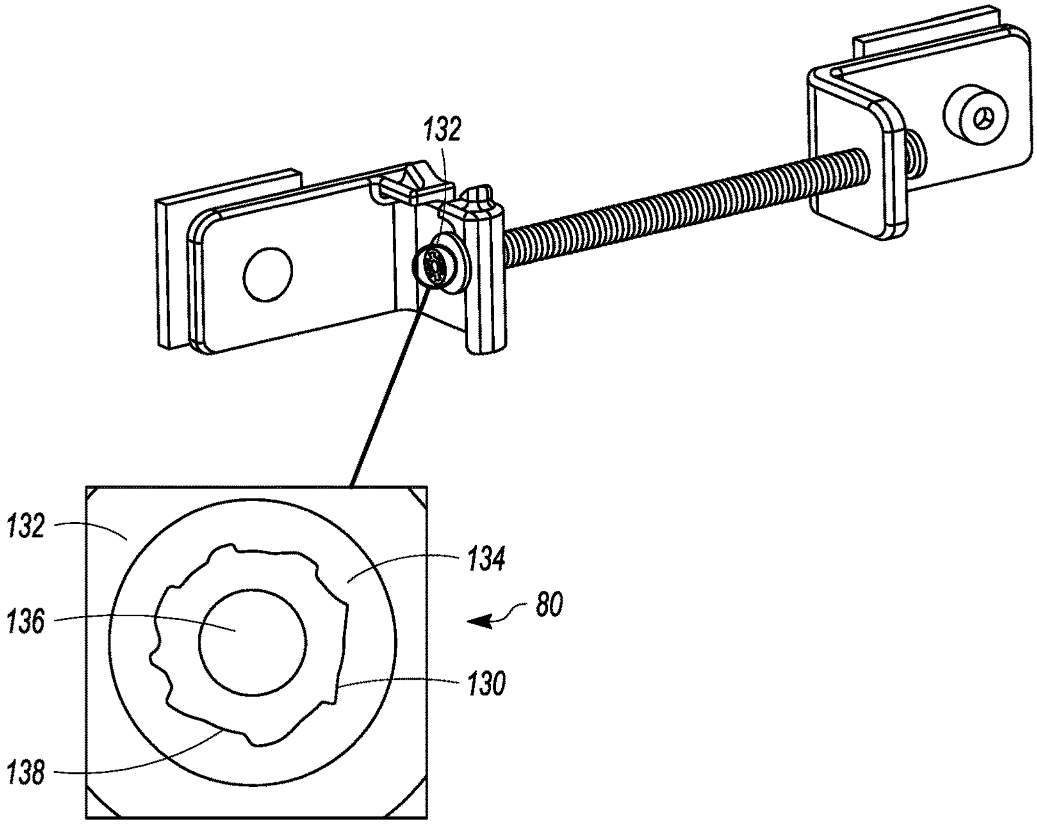
FIG. 14 illustrates an embodiment of a tamper-resistant fastener head and tool aperture.
Figure 15:
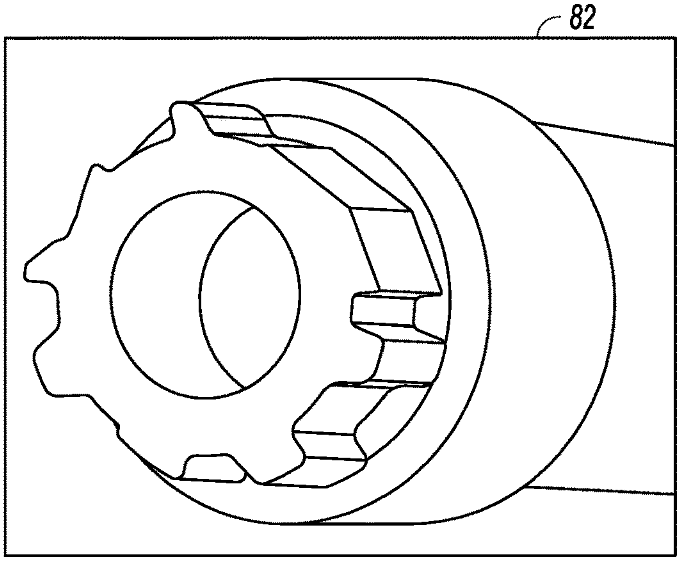
FIG. 15 illustrates an example of a tool head.

In embodiments, with reference to FIGS. 14-15 as an example, the tool aperture 80 defined in an end of the clamp member shaft may be a tamper-resistant tool aperture 130. The tamper-resistant tool aperture 130 may be defined or partially defined by a fastener head 132 affixed to the end of the shaft. (In addition to defining or partially defining the tool aperture, a lip portion of the head may also define one of the first flange 76 or the second flange 110.) Tamper-resistant aspects may include one or more of the following: the head is rounded or otherwise lacks opposing flat side surfaces, such that the head cannot be operably engaged using a wrench, pliers, sockets, or the like; the tool aperture is annular, as defined by a rim 134 (e.g., an outer rim) and a central pedestal 136 with an annular space 138 therebetween, such as prevents the aperture from being operably engaged with a screwdriver, a hex key (Allen wrench), a "torx" driver, or the like; the tool aperture includes irregular engagement features such that the tool aperture can only be operably engaged with a specialized tool having complementary irregular engagement features; the tool aperture is asymmetric; the tool aperture includes at least some engagement features that are rounded, such that only a specialized tool 82 having the same, complementary features is sufficient for operable engagement, while non-specialized tools that lack the features will "slip off," even if portions of the non-specialized tool fit inside the aperture; the tool aperture is otherwise shaped so that it cannot be operably engaged using standard tools like screwdrivers, hex keys, "torx" drivers, bit drivers, or the like; the tool aperture is unique to a particular product or group of products sold by one entity or multiple related entities; and/or distribution of the tool or tool head that is configured to operably engage the tool aperture is controlled, e.g., they are sold or otherwise distributed only to authorized individuals/entities. (In the context of this section, operable engagement refers to one or more of: engaging the head or tool aperture to rotate the shaft and unlock the clamp member without damaging the head or tool aperture; engaging the tool aperture to rotate the shaft to unlock the clamp member using an electric drill/screwdriver; and/or engaging the head or tool aperture to rotate the shaft and unlock the clamp member within a practical time period of 60 seconds or less.) Fastener heads with tamper-resistant tool apertures or other features, and corresponding tool heads, similar to those shown in FIGS. 14-15, may be available from Bryce Security Fastener company of Gilbert, Arizona.

Figure 16:
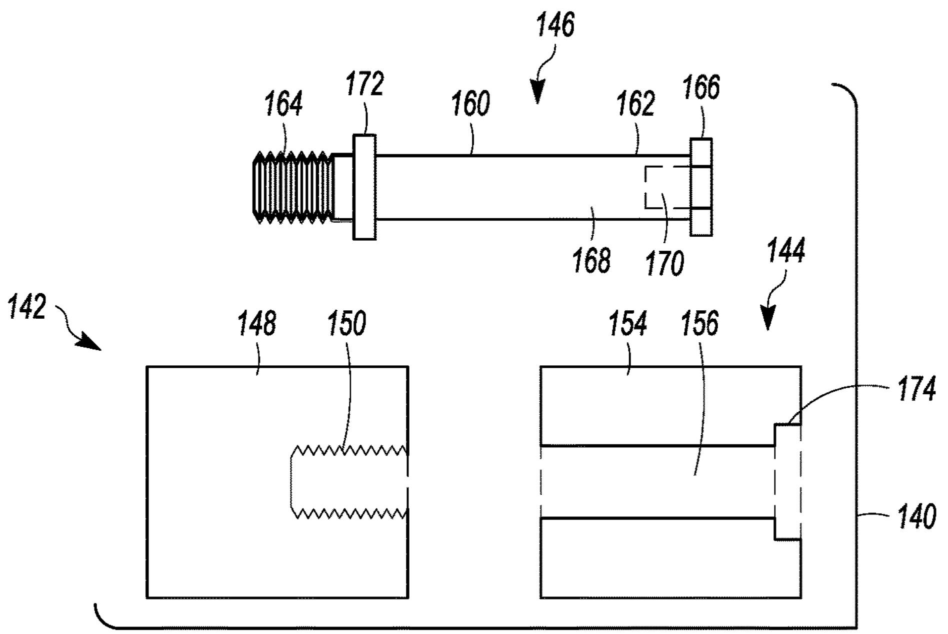
FIG. 16 illustrates another embodiment of a door lock system.
Figure 17:
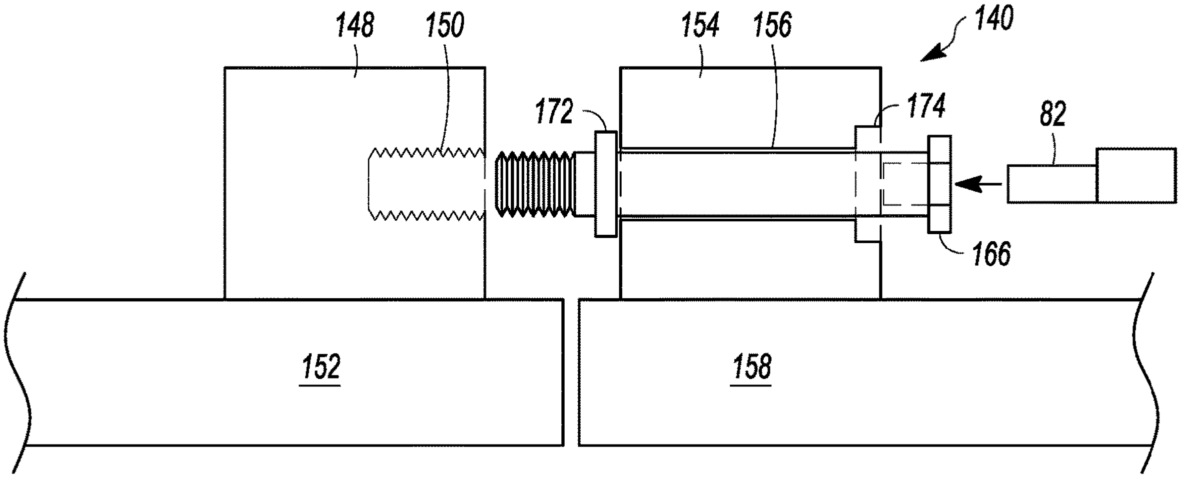
FIG. 17 illustrates the door lock system of FIG. 16 in a first, unlocked operative state.
Figure 18:
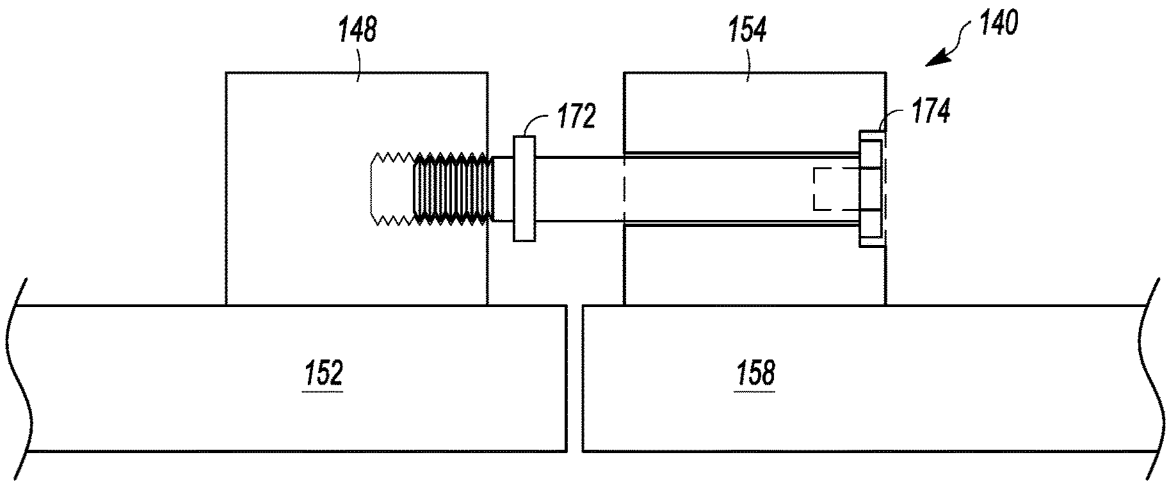
FIG. 18 illustrates the door lock system of FIG. 16 in a second, locked operative state.

FIGS. 16-18 show another embodiment of a door lock system 140. The system 140 includes a first latch assembly 142, a second latch assembly 144, and a clamp member 146. The first latch assembly includes a first latch member 148 defining a threaded aperture 150 (e.g., a blind hole tapped with threads) and configured for attachment to a first door member 152. The second latch assembly includes a second latch member 154 having a slot 156 (e.g., a through-hole) extending therethrough and configured for attachment to a second door member 158. The clamp member has an elongate shaft 160 with a first end 162 and a second end 164. A first flange 166 is attached to the first end, and the second end is threaded for screwing into the threaded aperture 150 of the first latch member. An end region 168 of the shaft adjacent the first end is configured to be disposed through the slot of the second latch member. The first end of the shaft defines a tool aperture 170 (e.g., a tamper-resistant tool aperture) configured to receive a tool head 82 for rotation of the shaft. The shaft is dimensioned to fit through the slot, but the first flange 166 is dimensioned wider than the slot, such that the first flange cannot pass through the slot.

For installation, the first latch member 148 is fixedly attached to the first door member 152, and the second latch member 154 is fixedly attached to the second door member 158, e.g., using bolts/nuts or other fasteners. The two are attached so that the slot 156 is in axial alignment with the aperture 150. The shaft 160 of the clamp member 146 is passed through the slot 156 on one side of the second latch member so that the second, threaded end of the shaft projects out the other side of the second latch member 154 towards the aperture 150. After being disposed through the slot in this manner, a second flange 172 (e.g., nut, clip, washer, etc.) may be affixed to the shaft at a location towards the second end of the shaft, to prevent the clamp member from being freely removed from the second latch member.

With reference to FIG. 17, in an unlocked operative state, the clamp member lies loose in the slot of the second latch member, with the threaded end of the shaft disengaged from but aligned with the threaded aperture of the first latch member. A tool head 82 is engaged with the tool aperture 170, and is used to move the clamp member towards the first latch member and to rotate the shaft for screwing the threaded end of the shaft into the threaded aperture. This causes the first flange 166 to move towards and come into abutment with the side of the second latch member, connecting the two latch members together and securing the door members closed, as shown in FIG. 18. For unlocking, the tool head is used to unscrew the threaded end of the clamp member shaft from the threaded aperture, back to the position as shown in FIG. 17.

As shown, in embodiments, the second latch member 154 may be provided with a counter-sunk depression or bore 174, concentric with the slot 156 on the one side of the second latch member (the side configured to be positioned facing away from the first latch member when the system is installed), which has a larger diameter than the bore and is sized to receive the first flange 166 (e.g., the bore 174 has a slightly larger diameter than a diameter of the first flange 166). The bore 174 establishes, in effect, an annular lip (or, to put it another way, a recessed annular lip is formed in the latch member, which defines the counter-sunk depression/bore); when the clamp member shaft is screwed into the threaded aperture, the first flange comes to rest against the second latch member within the depression/bore 174.

The first and second latch members 148, 154 are shown as a block-like members in the drawings, but, alternatively, they may be similar to the latch members shown in FIGS. 1-15 (as applicable), e.g., each may include an L-bracket, with the second latch member 154 having a through-hole slot instead of a side slot.

In embodiments, the first latch member 148 includes a lead-in to the aperture 150. For example, the aperture includes an inner cylindrical portion, and the lead-in may include a tapered annular surface extending from the outermost terminus of the cylindrical portion through to outer side surface of the first latch member, e.g., in a funnel shape. Thereby, the entrance to the aperture is wider than its inner, threaded portion and also sloped, such that if the shaft of the clamp member is out of alignment when moved towards the aperture, it encounters and slides along the lead-in and is guided into place for engaging the threads of the aperture.

Figure 21:
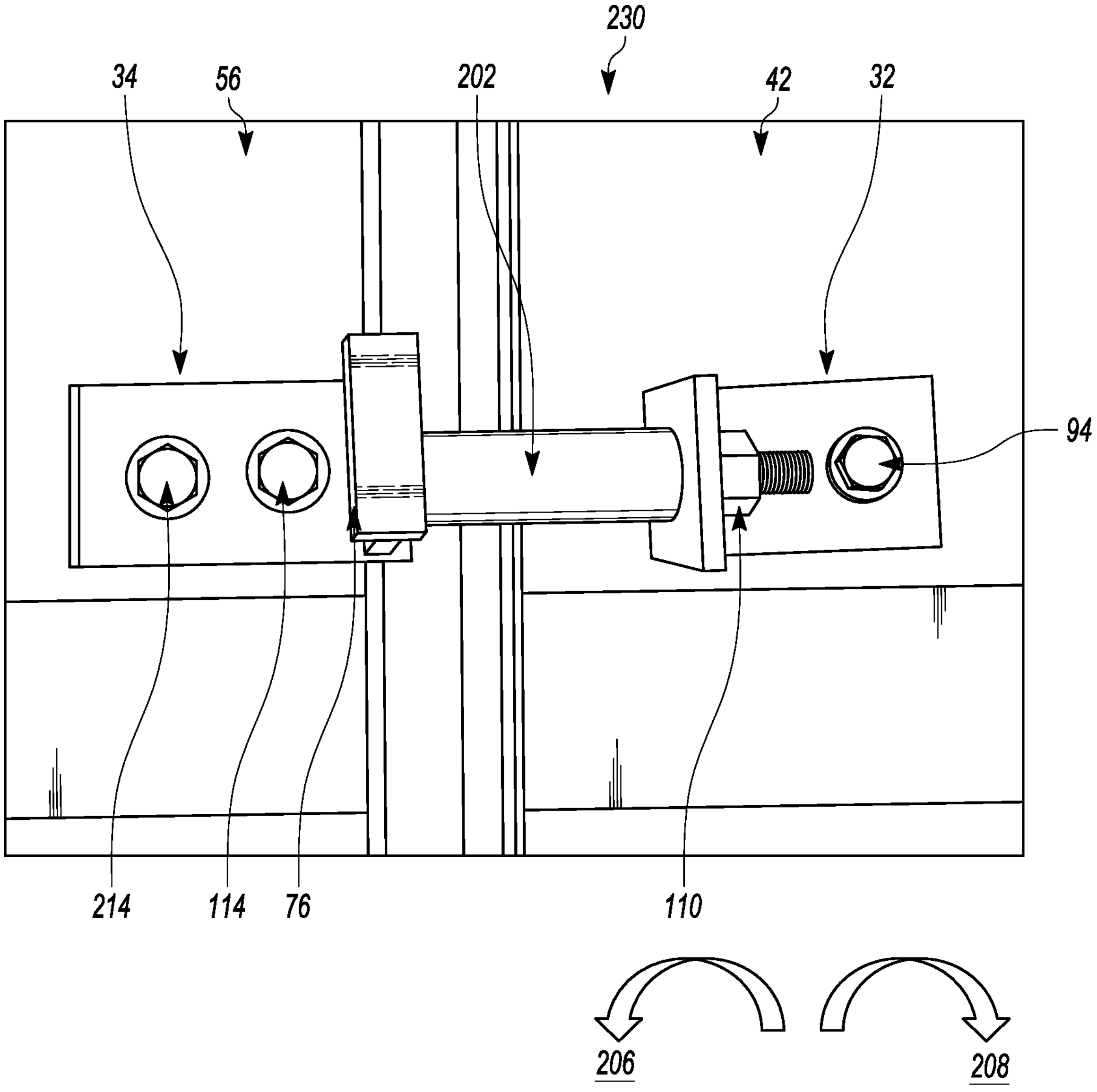
FIG. 21 illustrates another embodiment of a door lock system.

FIG. 21 illustrates another embodiment of a door lock system 230. Like the door lock system shown in FIGS. 1-13, the door lock system 230 includes the first latch assembly 32, the second latch assembly 34, and the clamp member 36. The first latch assembly is coupled with the first door member 42, and the second latch assembly is coupled with the second door member 56.

In the illustrated embodiment, the second latch assembly is coupled with the second door member in a non-pivotal attachment. For example, the second latch assembly is coupled with the second door member via a second fastener unit 114 and a third fastener unit 214. Additionally, the first latch assembly is pivotally attached with the first door member via the first fastener unit 94 which represents the pivot connector assembly. For example, the pivot connector assembly allows the first latch assembly to pivot in a first direction 206 toward an engaged state of the door lock system, or in a second direction 208 toward a disengaged state of the door lock system. For example, when the door lock assembly is in the engaged state, the first end of the elongate shaft is positioned within the side slot of the second latch assembly, and when the door lock assembly is in the disengaged state, the first end of the elongate shaft is rotated to be positioned outside of the side slot of the second latch.

The door lock system also includes a sleeve 202 that extends around a portion of the elongate shaft. For example, the sleeve includes a passage extending therein, and a portion of the shaft the extends between the first latch assembly and the second latch assembly is disposed in the passage. Optionally, the sleeve may extend a length that is less than a length of the elongate shaft between the first and second latch assemblies. The sleeve may prevent access to the portion of the shaft disposed within the passage of the sleeve. For example, the sleeve may provide a secondary level of protection, such as to prohibit an unauthorized person from cutting the shaft to access cargo disposed within the vehicle.

Figure 22:
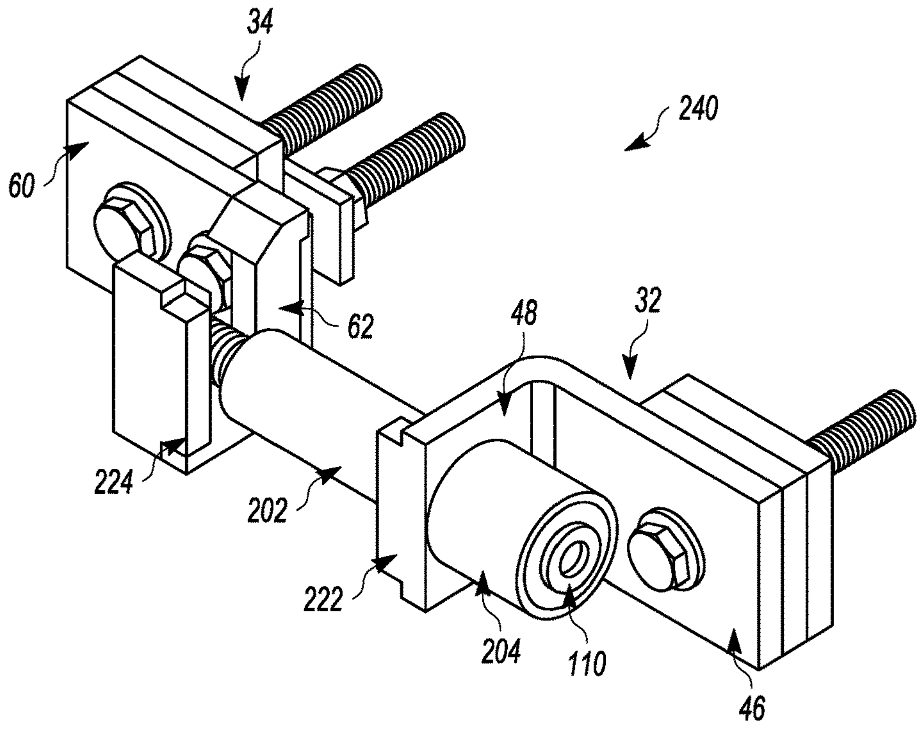
FIG. 22 illustrates a perspective view of another embodiment of a door lock system.

Optionally, the door lock system may include plural sleeves. For example, FIG. 22 illustrates a door lock system 240 in accordance with one or more embodiments. The door lock system includes the first and second latch assemblies and the elongate shaft of the clamp member that extends between the first and second latch assemblies while the door lock system is in the engaged state. Like the door lock system shown in FIG. 21, the door lock system 240 includes the sleeve 202 disposed between the first and second latch assemblies. Additionally, the door lock system also includes a second sleeve 204 that is disposed at the second end of the elongate shaft. For example, the second sleeve includes one or more surfaces defining an interior passage, and a portion of the second end of the shaft is disposed within the passage of the second sleeve. In the illustrated embodiment, the second flange 110 is also disposed within the passage of the second sleeve. The plural sleeves 202, 204 may prevent access to different portions of the shaft that are disposed within the interior passages of the sleeves.

The door lock system shown in FIG. 22 also includes a first clamp plate extension 222 that is coupled with the first clamp plate 48 of the first latch assembly, and a second clamp plate extension 224 that is coupled with the second clamp plate 62 of the second latch assembly. The first and second clamp plate extensions extend in directions toward each other. For example, the first L-bracket may be referred to as a first S-bracket, and the second L-bracket may be referred to as a second S-bracket. Like the plural sleeves, the first and second clamp plate extensions may be designed to prevent access to portions of the elongate shaft that are disposed under the first and second clamp plate extensions, such as while the door lock system is in the engaged state.

Figure 23:
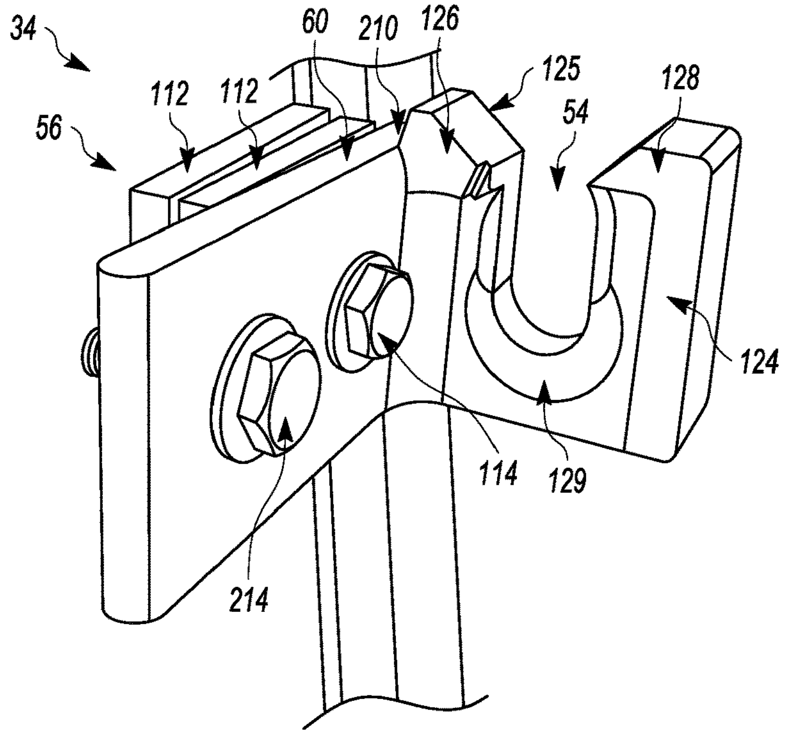
FIG. 23 illustrates a magnified view of an embodiment of a second latch assembly of a door lock system in accordance with one embodiment.

FIG. 23 illustrates a magnified view of an embodiment of the second latch assembly 34 of a door lock system in accordance with one embodiment. The second latch assembly includes the second latch member having the side slot 54 extending from a side wall of the second clamp plate, and a second base plate 60 coupled with the second clamp plate. The second latch assembly is coupled with the second door member 56 via second and third fastener units 114, 214, with two backer plates 112 disposed between the second base plate and the second door member. In the illustrated embodiment, the second fastener unit includes a fastener that extends through the second base plate, each of the backer plates, and the second door member. Alternatively, the third fastener unit includes a fastener that extends through only the second base plate and the second door member. Optionally, the second latch assembly may be coupled with the second door member in an alternative configuration.

The second latch member includes a recess 210 disposed proximate an intersection between the second clamp plate and the second base plate. For example, the recess may be a void or gap between the clamp and base plates. In one embodiment, the recess may be an undercut in the geometry of the second latch member. For example, the undercut may be necessary for manufacturing purposes, to provide space to allow for the lip tab 126 and/or the lead-ins 125, or the like.

Figure 24:
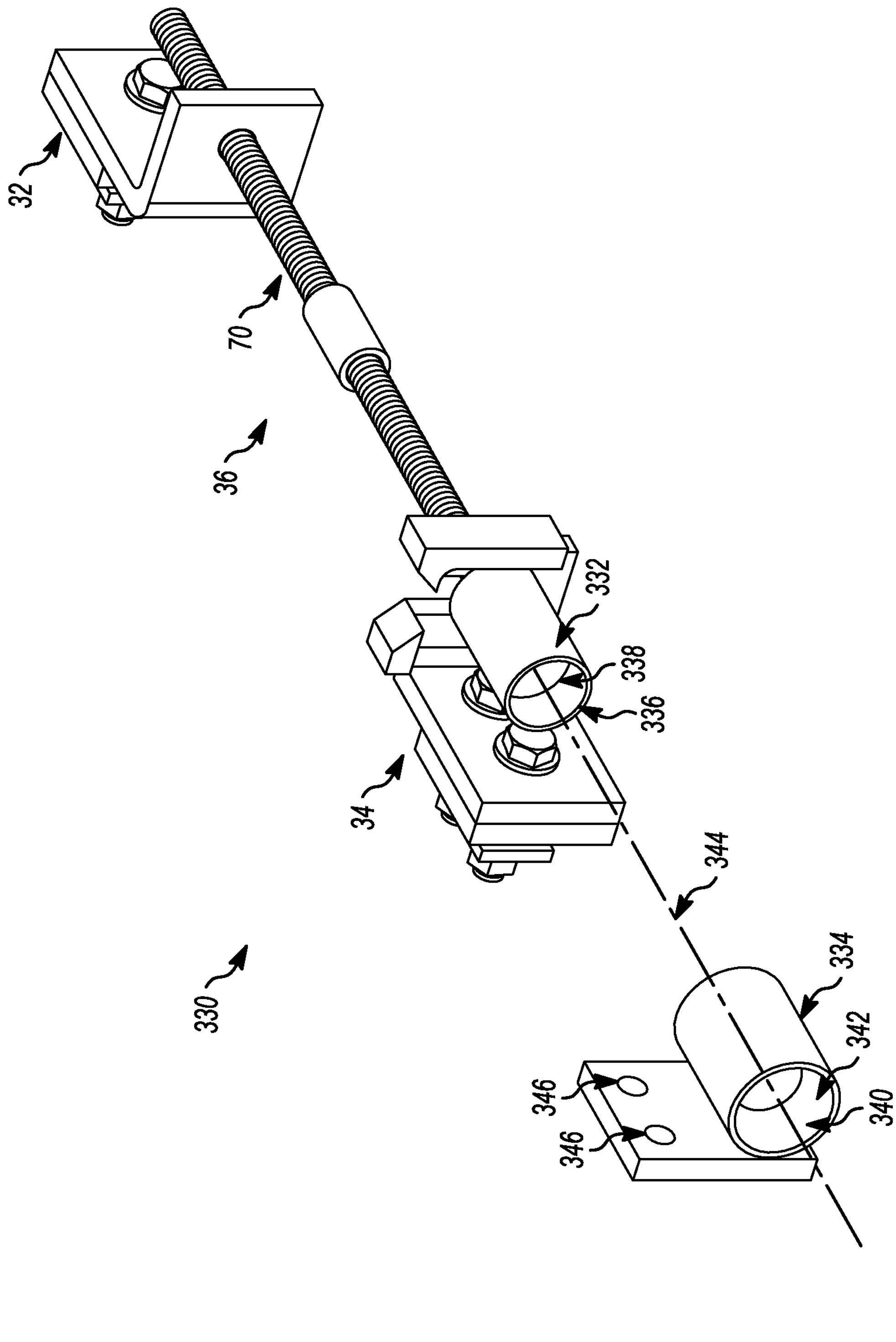
FIG. 24 illustrates another embodiment of a door lock system.

FIG. 24 illustrates another embodiment of a door lock system 330 in accordance with one or more embodiments. Like the door lock systems shown in FIGS. 1-13, 21, and 22, the door lock system 330 includes the first and second latch assemblies 32, 34, with the clamp member 36 including the elongate shaft 70 that extends between first and second ends. In the illustrated embodiment of FIG. 24, the door lock system is in the engaged state. For example, the first latch assembly has been pivoted such that the end region adjacent to the first end of the shaft is received in the side slot of the second latch member to bring the shaft and the second latch member into engagement.

The door lock system also includes a first guide 332 that is coupled with the end region that is adjacent to the first end of the shaft that includes the tool aperture. Alternatively, the second end of the shaft may include the tool aperture, and the first guide may be coupled with the second end of the shaft that defines the aperture. In one or more embodiments, the first guide may be formed as a common or unitary structure with the elongate shaft, may be welded or otherwise fastened with the end region of the shaft, or the like. The first guide includes one or more interior surfaces 336 that define a pocket 338. In the illustrated embodiment, the pocket includes an end surface that is coupled with the end region of the shaft, and extends in a direction away from the second latch member. The tool apertured may be disposed within the pocket, and the tool head may be received within the pocket of the first guide for rotation of the shaft. In one or more embodiments, the interior surfaces of the first guide may include a necked-down design, a ramp, a funnel-feature, or the like, that may be used to assist with guiding the tool head into the pocket.

In one or more embodiments, the door lock system may also include a second guide 334. The second guide may be attached or coupled with the second door member, such as via one or more fasteners (not shown) received within coupling holes 346 of the second guide. Like the first guide, the second guide may include one or more interior surfaces 340 that define a passage 342 extending within the second guide. The second guide may be coupled with the second door member such that the first and second guides may be linearly aligned with each other along an axis 344. In one or more embodiments, the interior surfaces of the second guide may include a neck-down design, a ramp, a funnel-feature, or the like, that may be used to assist with guiding the tool head through the passage and toward the pocket of the first guide.

While the door lock system is in the engaged state (e.g., the end of the shaft that defines the tool aperture is disposed within the side slot), an operator may control movement of the tool head such that the tool head is received within the passage of the second guide, moves along the axis in the linear direction toward the first guide, and is received within the pocket of the first guide to engage with the tool aperture. The operator may control movement of the tool head to rotate the tool aperture to loosen or tighten the door lock system. For example, rotating the tool head in a first direction rotates the tool aperture in the same first direction, and moves the first flange away from the second latch member to loosen the door lock system. Alternatively, rotating the tool head in a second direction rotates the tool aperture in the same second direction, and moves the first flange toward the second latch member to abut the first flange with the second latch member and to tighten the door lock system.

Figure 25:
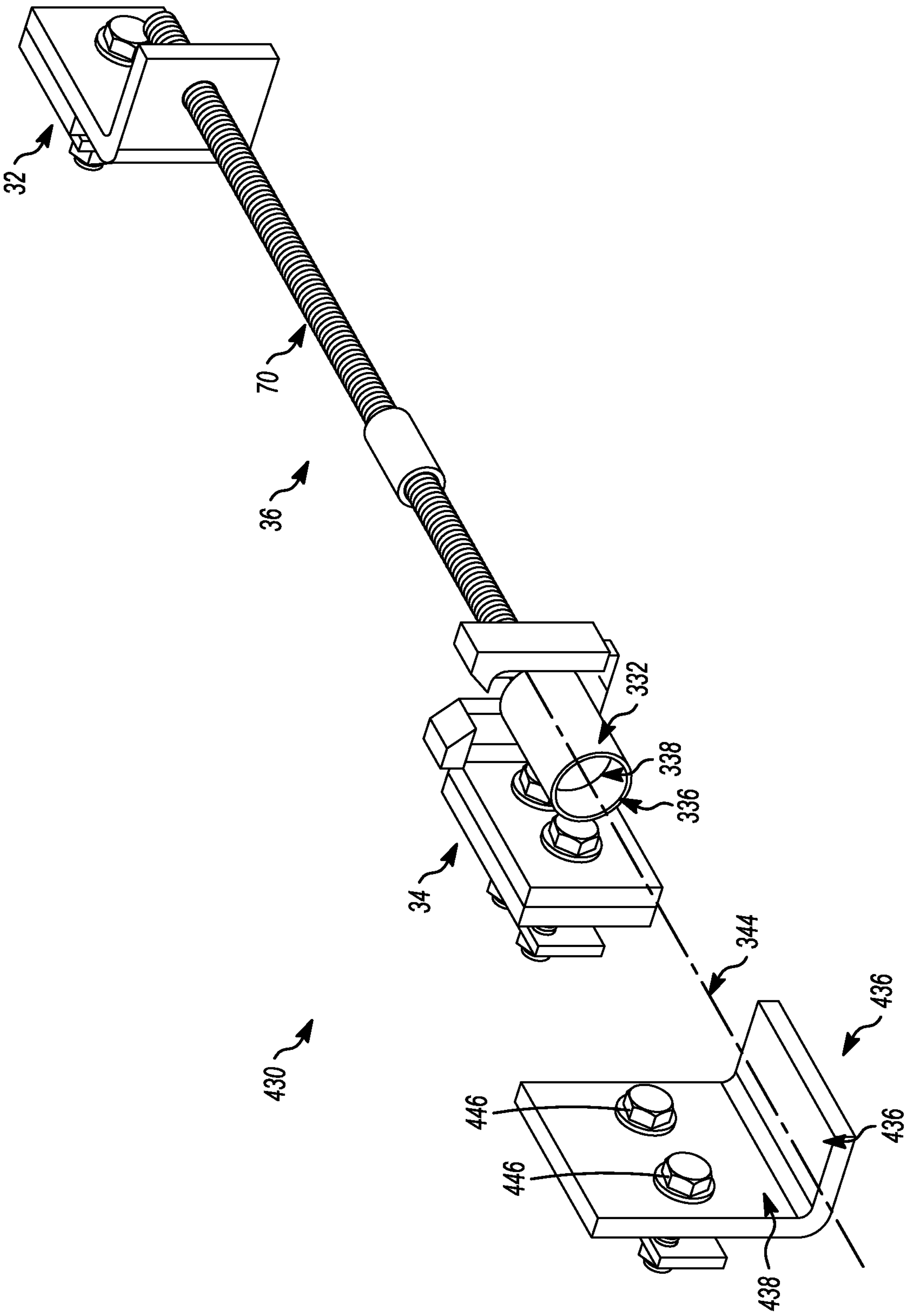
FIG. 25 illustrates another embodiment of a door lock system.

FIG. 25 illustrates a door lock system 430 in accordance with another embodiment. Like the door lock system shown 330 in FIG. 24, the door lock system 430 includes the first and second latch assemblies 32, 34, with the clamp member 36 including the elongate shaft 70 that extends between first and second ends. The door lock system also includes the first guide 332 that is coupled with the end region that is adjacent to the first end of the shaft that includes the tool aperture. The first guide includes the interior surfaces 336 that define the pocket 338 in which the tool aperture is disposed.

The door lock system also includes a second guide 434 that is coupled with the second door member of the vehicle via plural fastener units 446. In the illustrated embodiment, the second guide includes a first surface 436 that is coupled with a second surface 438. The first and second surfaces are coupled at substantially a right angle such that the first and second surfaces extend in substantially perpendicular directions relative to each other. In one embodiment, the second guide may be referred to as an L-bracket such that the first and second surfaces form an L-shape. Optionally, the first surface may extend in an alternative radial direction that is not perpendicular to the second surface. For example, the first and second surfaces may be coupled at an acute angle. The first and second surfaces of the second guide define a passage along which the tool head may extend.

The first surface of the second guide may be linearly aligned with the pocket of the first guide along the axis 344. While the door lock system is in the engaged state (e.g., the end of the shaft that defines the tool aperture is disposed within the side slot), an operator may control movement of the tool head to move toward the door lock system. The first surface of the second guide substantially maintains the position of the tool head to move along the axis while the tool head moves in the linear direction toward the first guide, and is received within the pocket of the first guide to engage with the tool aperture. In one or more embodiments, the door lock system may include two or more second guides, with the first surface of each second guide aligned with each other and the pocket of the first guide along the axis.

Figure 26:
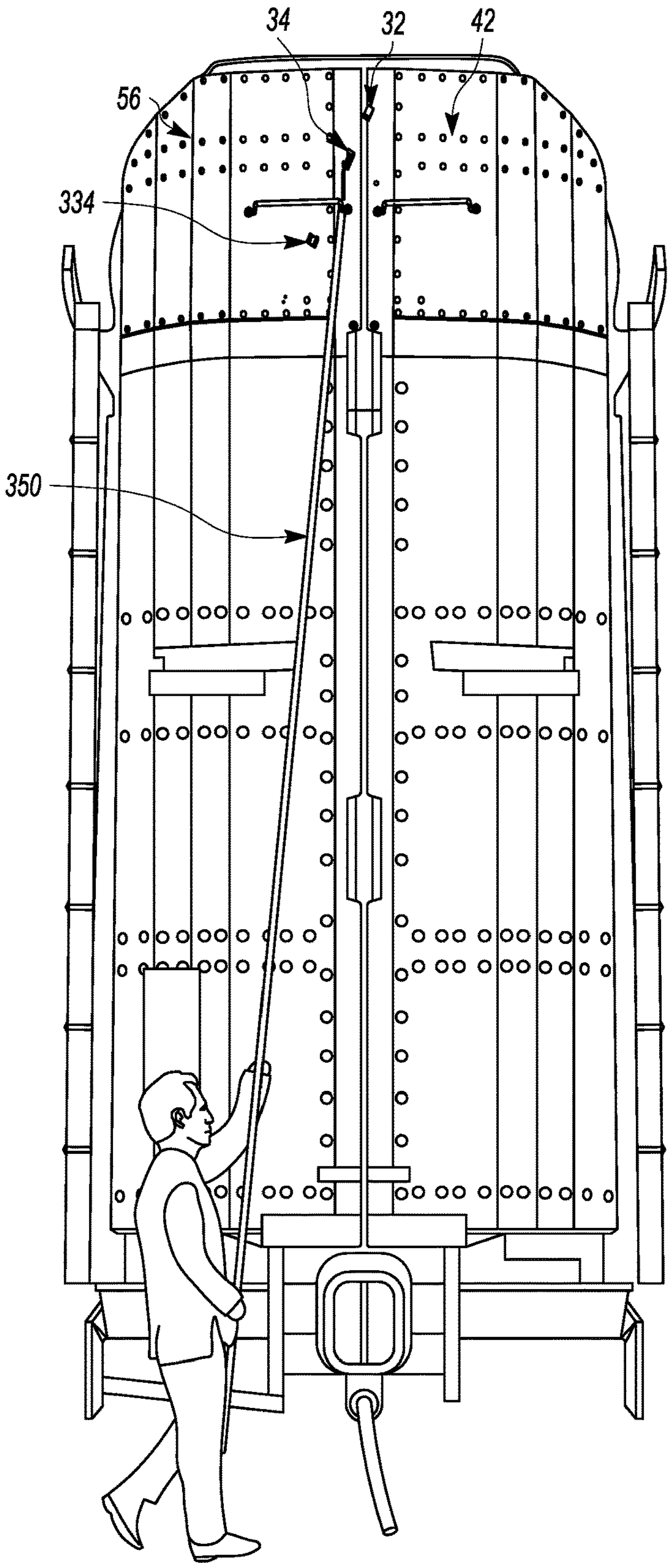
FIG. 26 illustrates the door lock system shown in FIG. 24 attached with door members of a vehicle.

FIG. 26 illustrates a rail vehicle that includes the first door member 42, the second door member 56, and the door lock system 330 shown in FIG. 24. Optionally, the door lock system 430 shown in FIG. 25 may be coupled with the door members of the rail vehicle. The door lock system includes the first latch assembly 32 that is pivotally coupled with the first door member, the second latch assembly 34 that is non-pivotally coupled with the second door member, a clamp member that includes the shaft with the first guide coupled with the end of the shaft that defines the tool aperture, and the second guide 334 that is coupled with the second door member. The second door member may be positioned such that the passage of the second guide is linearly aligned with the pocket of the first guide when the end region of the shaft is disposed within the side slot of the second latch assembly.

Figure 27:
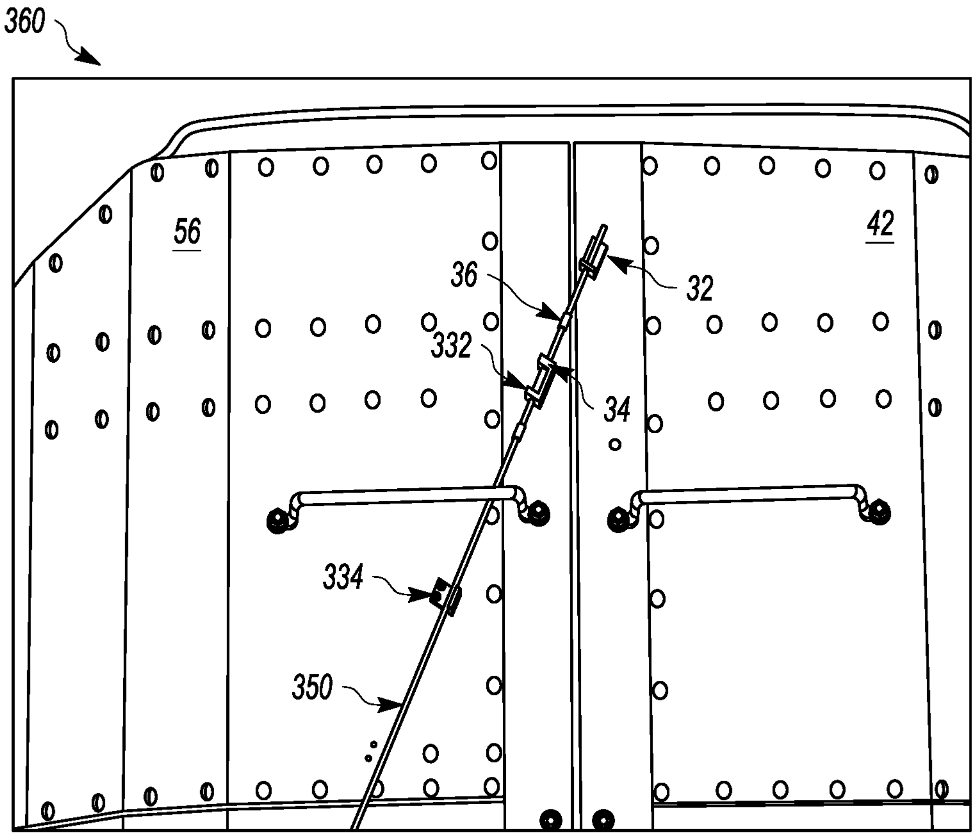
FIG. 27 illustrates a magnified view of the door lock system shown in FIG. 26 in an engaged state.

In the illustrated embodiment, an operator is standing on ground level, and may control movement of a tool 350 that includes the tool head. FIG. 27 illustrates a magnified view of the door lock system shown in FIG. 26. While the operator is standing at ground level, the operator may control movement of the tool to direct the tool head (not shown) disposed at an end of the tool through the passage of the second guide and into the pocket of the first guide. The tool head may engage with the tool aperture disposed within the pocket of the first guide. Rotation of the tool and tool head causes rotation of the tool aperture of the door lock system to move the door lock system between the loosened state or the tightened state. For example, loosening the door lock system moves the first flange away from the second latch member, and tightening the door lock system moves the first flange toward the second latch member to secure the first and second door members together.

Figure 28:
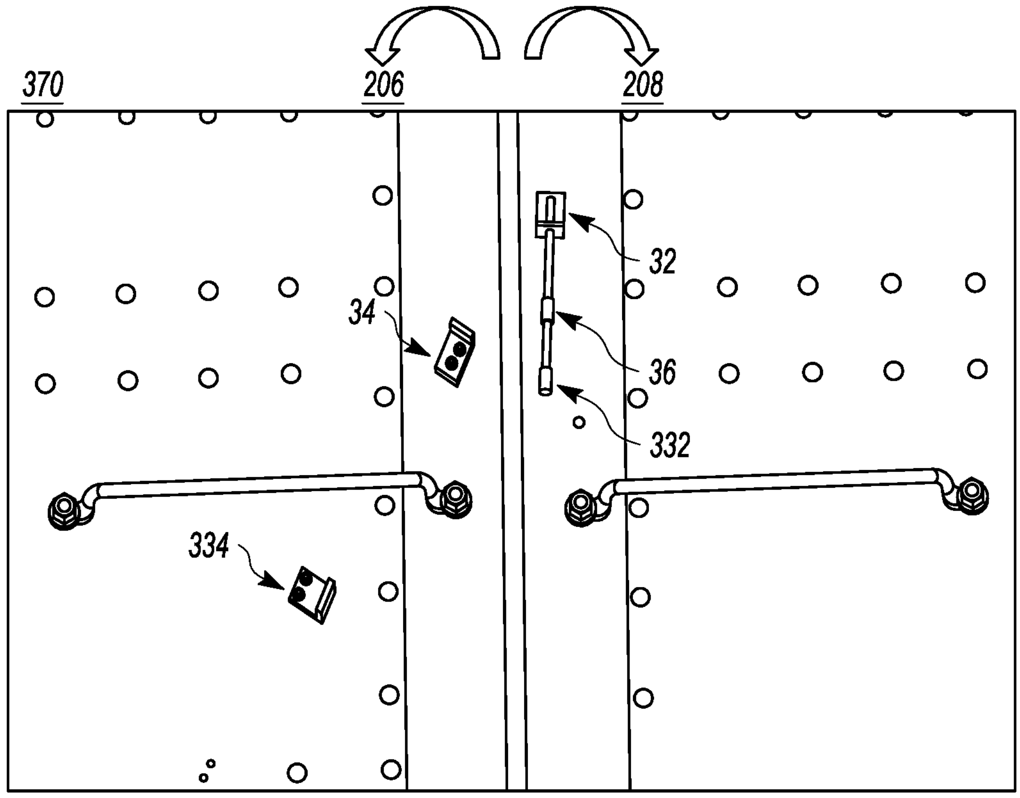
FIG. 28 illustrates a magnified view of the door lock system shown in FIG. 26 in a disengaged state.

While the door lock system is in the loosened state, the operator may control movement of the clamp member to move the clamp member between the engaged state and the disengaged state. For example, in the illustrated embodiment of FIG. 27, the clamp member is in the engaged state such that the end region adjacent to the first end of the elongate shaft is disposed within the side slot of the second latch member. While the clamp member is in the engaged state, the door lock system may be loosened or tightened. Alternatively, FIG. 28 illustrates a magnified view of the door lock system shown in FIG. 25 but in the disengaged state. For example, the elongate shaft has rotated in the second direction 208 and the end region adjacent to the first end of the shaft has moved out of the side slot of the second latch member. In one embodiment, an operator may climb up the vehicle to reach the door lock system, may stand on a ladder or elevated platform, or may use a tool (e.g., the tool 350 shown in FIGS. 25 and 26 or a different tool) to control movement of the clamp member to pivot the first latch assembly to move the elongate shaft in the second direction 208 away from the side slot (e.g., toward the disengaged state) or in the first direction 206 toward the side slot (e.g., toward the engaged state).

Figure 29:
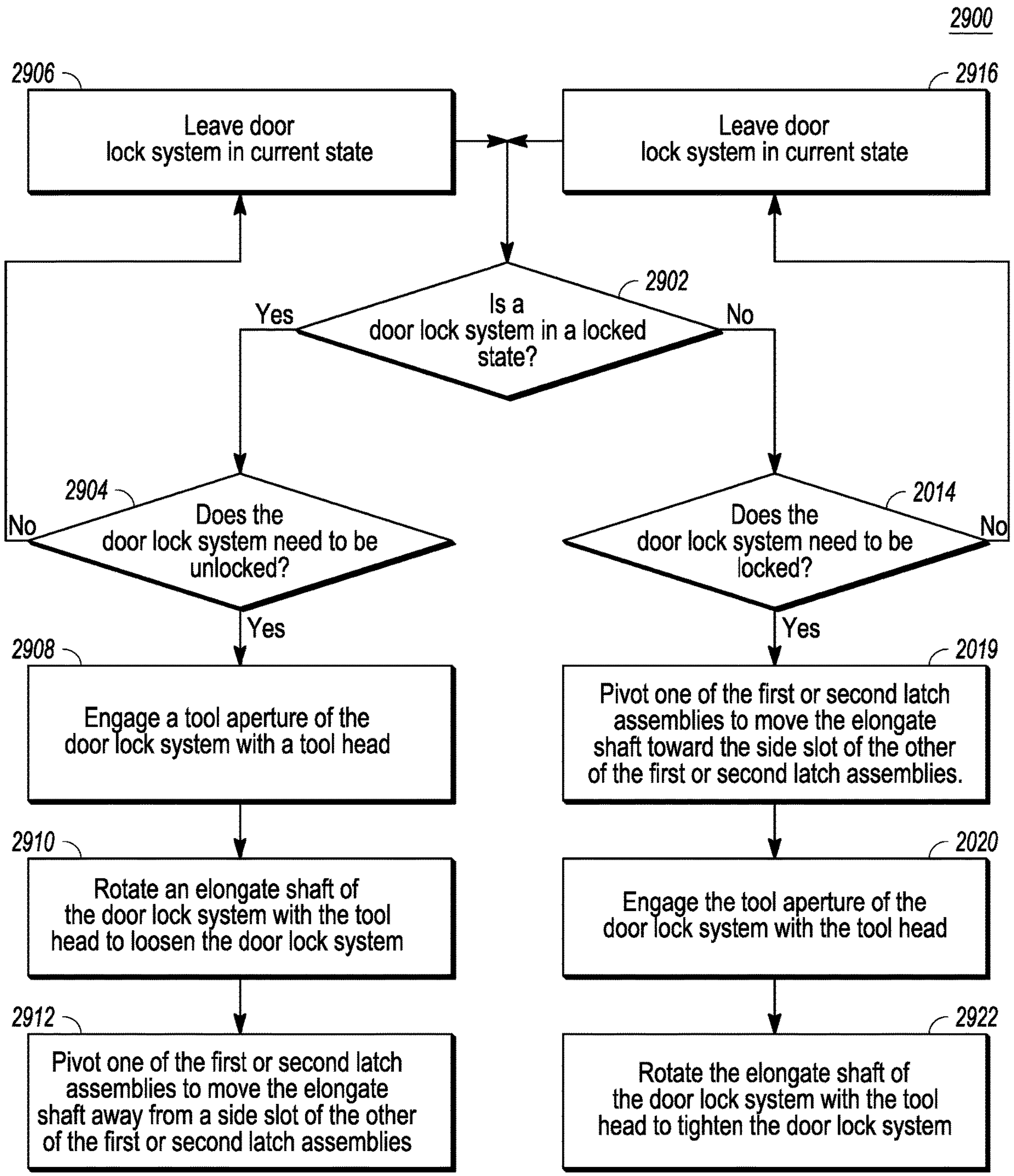
FIG. 29 illustrates a flowchart of one example of a method of engaging a door lock system in accordance with one embodiment.

FIG. 29 illustrates a flowchart 2900 of one example of a method of engaging a door lock system in accordance with one embodiment. At step 2902, a determination is made whether the door lock system is in a locked state. If the door lock system is in the locked state (e.g., the first and second door members are secured), then flow of the method proceeds toward step 2904. Alternatively if the door lock system is not in the locked state (e.g., the first and second door members are not secured), then flow of the method proceeds toward step 2914.

At step 2904, a determination is made whether the door lock system needs to be unlocked. For example, if the door lock system is in the locked state, the door lock system may need to be unlocked, such as to access cargo disposed onboard the vehicle. If the door lock system needs to be unlocked, flow of the method may proceed toward step 2908. Alternatively, if the door lock system does not need to be unlocked, flow of the method may proceed toward step 2906, where the door lock system is left in the current state.

At step 2908, to unlock the door lock system, a tool aperture of the door lock system is engaged with a tool head. Movement of the tool head may be manually controlled, such as be an operator of the vehicle, may be automatically controlled, such as by a robotic system, or the like. In one or more embodiments, the tool aperture may be a tamper-resistant tool aperture, and the tool head may be specifically designed to engage with the tamper-resistant tool aperture.

At step 2910, responsive to the tool head engaging with the tool aperture, the tool head may be rotated to cause the tool aperture to rotate. Rotating the tool aperture in one direction moves a first flange of an elongate shaft of the door lock system away from a second latch member. Alternatively, rotating the tool aperture in a different direction moves the first flange toward the second latch member to abut against the second latch member. Moving the first latch away from the second latch member moves the door lock system to a loosened state.

At step 2912, one of the first or second latch assemblies is pivoted to move the elongate shaft away from a side slot of the other of the first or second latch assembly. For example, the second latch assembly may include the side slot, and the first latch assembly may be pivoted to move the elongate shaft away from the side slot. Pivoting the latch assembly to move the elongate shaft out of engagement with and away from the side slot moves the door lock system to a disengaged state. For example, the elongate shaft is not engaged with the side slot while the door lock system is in the disengaged state. The door members of the vehicle may be opened and closed while the door lock system is in the disengaged state.

Returning to step 2902, if the door lock system is not in the locked state, flow of the method proceeds toward step 2914. At step 2914, a determination is made whether the door lock system needs to be locked. If the door lock system does not need to be locked, flow of the method may proceed toward step 2916, where the door lock system is left in the current state. Alternatively, if the door lock system needs to be locked, flow of the method proceeds toward step 2918.

At step 2918, one of the first or second latch assemblies may be pivoted to move the elongate shaft toward the side slot of the other of the first or second latch assembly. Moving the elongate shaft toward the side slot moves the elongate shaft into engagement with the side slot such that a portion of the elongate shaft is disposed within the side slot. The door lock system is in the engaged state while the portion of the elongate shaft is disposed within the side slot.

At step 2920, the tool aperture of the door lock system is engaged with the tool head, and at step 2922, the tool head is rotated to cause rotation of the tool aperture. Rotating the tool head and the tool aperture in one direction causes the first flange of the door lock system to move toward and abut against the second latch member to secure the first and second door members of the vehicle. Alternatively, rotating the tool head and the tool aperture in a different direction causes the first flange to move away from the second latch member, wherein the first and second door members are not secure.

In accordance with one example or aspect, a door lock system includes a first latch assembly, a second latch assembly, and a clamp member. The first latch assembly includes a first latch member defining a threaded aperture and configured for pivotal attachment to a first door member. The second latch assembly includes a second latch member having a side slot extending therethrough and configured for attachment to a second door member. The clamp member has an elongate shaft with a first end and a second end. A first flange is attached to the first end, and the second end is threaded for screwing into the threaded aperture of the first latch member. An end region of the shaft adjacent the first end is configured to be disposed through the side slot of the second latch member. The first end or the second end of the shaft defines a tool aperture (e.g., a tamper-resistant tool aperture) configured to receive a tool head for rotation of the shaft. When the end region is received in the side slot and the shaft is rotated to screw the second end of the shaft into (e.g., further into) the threaded aperture, the first flange moves towards the second latch member and comes into abutment with the second latch member. This connects the shaft, the first latch member, and the second latch member together, for securing the first door member with the second door member.

Optionally, the clamp member may include a second flange attached at or towards the second end of the shaft. The second flange may prevent the shaft from being removed from the threaded aperture of the first latch member.

Optionally, the side slot of the second latch member may extend from an interior region of the second latch member through to an opening in a side of the second latch member. A height of the opening may correspond to a lateral cross-dimension of the shaft. The second latch member may include at least one lip positioned adjacent to the opening and defining a clearance dimensioned to interfere with the first flange, to prevent the shaft from being slidably removed from the side slot, when the first flange abuts the second latch member.

Optionally, the first latch member may include a first L-bracket and the second latch member may include a second L-bracket. The first L-bracket may include a first base plate for attachment to the first door member and a first clamp plate attached perpendicularly to the first base plate. The first clamp plate may define the threaded aperture. The second L-bracket may include a second base plate for attachment to the second door member and a second clamp plate attached perpendicularly to the second base plate. The second clamp plate may include the side slot.

Optionally, the first latch assembly may include a first backer plate and a first fastener unit. The first backer plate may abut the first door member and the first fastener unit may pivotally attach the first base plate of the first L-bracket to the first backer plate and to attach the first backer plate to the first door member.

Optionally, the second latch assembly may include a second backer plate and a second fastener unit. The second backer plate may abut the second door member and the second fastener unit may attach the second base plate of the second L-bracket to the second backer plate and the second backer plate to the second door member.

Optionally, the door lock system may include a head attached to the first end of the second of the shaft that defines the tool aperture. The head may include a central pedestal and a rim. The rim may extend around and be spaced concentrically away from the central pedestal. The rim and the pedestal may define the tool aperture therebetween. A perimeter edge of the tool aperture that is defined by the rim of the head may be irregular.

Optionally, the door lock system may include one or more sleeves extending around one or more portions of the elongate shaft. The one or more sleeves may prevent access to the one or more portions of the elongate shaft disposed within passages of the one or more sleeves.

Optionally, the door lock system may include a first guide coupled with the first end or the second end of the shaft that defines the tool aperture. The first guide may extend in a direction away from the second latch assembly and may include one or more interior surfaces defining a pocket configured to receive the tool head. The tool aperture may be disposed within the pocket.

Optionally, the door lock system may include a second guide that may be attached to the second door member. The second guide may include one or more surfaces defining a passage that is linearly aligned with the pocket of the first guide. The tool head may extend along the passage of the second guide and be received within the pocket of the first guide for the tool aperture to receive the tool head.

Optionally, a rail vehicle may include the door lock system, the first door member, and the second door member. The first door member and the second door member may be adjacent and at least one of the first door member or the second door member may be opened and closed for accessing an interior cargo space of the rail vehicle. The first latch assembly may be rotatably attached to the first door member on an exterior of the vehicle and the second latch member may be attached to the second door member on the exterior of the vehicle.

In accordance with one example or aspect, a door lock system (e.g., for rail vehicles or other vehicles) includes a first latch assembly, a second latch assembly, and a clamp member. The first latch assembly includes a first latch member defining a threaded aperture and configured for pivotal attachment to a first door member. The second latch assembly includes a second latch member having a side slot and configured for attachment to a second door member. The clamp member includes an elongate shaft and a first flange attached to a first end of the shaft. The shaft has a threaded, second end operably threadedly disposed in the threaded aperture of the first latch member. The first end or the second end of the shaft defines a tool aperture (e.g., a tamper-resistant tool aperture) configured to receive a tool head for rotation of the shaft. An end region adjacent the first end of the shaft is configured to be received in the side slot of the second latch member when the first latch member is pivoted to bring the shaft and second latch member into engagement. The first flange is configured, when the end region is received in the side slot and the shaft is rotated to screw the second end of the shaft further into the threaded aperture, to move towards and come into abutment with the second latch member. Thereby, the shaft, the first latch member, and the second latch member are connected together for securing the first door member with the second door member.

Optionally, the clamp member may include a second flange coupled with the second end of the shaft. The second flange may prevent the shaft from being removed from the threaded aperture of the first latch member.

Optionally, the tool aperture may be a tamper-resistant tool aperture.

Optionally, the door lock system may include a head attached to the first end or the second end of the shaft that defines the tool aperture. The head may include a central pedestal and a rim. The rim may extend around and be spaced concentrically away from the central pedestal. The rim and the pedestal may define the tool aperture therebetween. A perimeter edge of the tool aperture that is defined by the rim of the head may be irregular.

Optionally, the door lock system may include one or more sleeves extending around one or more portions of the elongate shaft. The one or more sleeves may prevent access to the one or more portions of the elongate shaft disposed within passages of the one or more sleeves.

Optionally, the door lock system may include a first guide coupled with the first end or the second end of the shaft that defines the tool aperture. The first guide may extend in a direction away from the second latch assembly and may include one or more interior surfaces defining a pocket configured to receive the tool head. The tool aperture may be disposed within the pocket.

Optionally, the door lock system may include a second guide that may be attached to the second door member. The second guide may include one or more surfaces defining a passage that is linearly aligned with the pocket of the first guide. The tool head may extend along the passage of the second guide and be received within the pocket of the first guide for the tool aperture to receive the tool head.

In accordance with one example or aspect, a vehicle includes a chassis, a first door member, and a second door member. The first and second door members are attached to the chassis, are adjacent, and at least one of the first door member or the second door member may be opened and closed for accessing an interior cargo space of the vehicle. One or more lock systems may be attached to the first and second door members for selectively securing the members at multiple points. Each of the one or more lock systems may include a first latch assembly, a second latch assembly, and a clamp member. The first latch assembly includes a first latch member defining a threaded aperture. The second latch assembly includes a second latch member having a side slot. One of the first latch assembly or the second latch assembly is attached to the first door member and the other is rotatably attached to the second door member. The clamp member includes an elongate shaft and a first flange attached to a first end of the shaft. The shaft includes a threaded, second end operably threadedly disposed in the threaded aperture of the first latch member. An end region adjacent to the first end of the shaft may be received in the side slot of the second latch member when the first latch assembly or the second latch assembly is rotated to bring the shaft and the second latch member into engagement. One of the first end or the second end of the shaft may define a tool aperture to receive a tool head for rotation of the shaft. The first flange may be configured, when the end region is received in the side slot and the shaft is rotated to screw the second end of the shaft in the threaded aperture for the first flange to move toward the second latch member, to abut the second latch member to connect the shaft, the first latch member, and the second latch member together for securing the first door member with the second door member.

Optionally, the clamp member may include a second flange attached at or towards the second end of the shaft. The second flange may prevent the shaft from being removed from the threaded aperture of the first latch member.

As used herein, an element or step recited in the singular and proceeded with the word "a" or "an" do not exclude the plural of said elements or operations, unless such exclusion is explicitly stated. Furthermore, references to "one embodiment" of the invention do not exclude the existence of additional embodiments that incorporate the recited features. Moreover, unless explicitly stated to the contrary, embodiments "comprising," "comprises," "including," "includes," "having," or "has" an element or a plurality of elements having a particular property may include additional such elements not having that property. In the appended claims, the terms "including" and "in which" are used as the plain-English equivalents of the respective terms "comprising" and "wherein." Moreover, in the following claims, the terms "first," "second," and "third," etc. are used merely as labels, and do not impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function devoid of further structure.

The above description is illustrative, and not restrictive. For example, the above-described embodiments (and/or aspects thereof) may be used in combination with each other. In addition, many modifications may be made to adapt a particular situation or material to the teachings of the subject matter without departing from its scope. While the dimensions and types of materials described herein define the parameters of the subject matter, they are exemplary embodiments. Other embodiments will be apparent to one of ordinary skill in the art upon reviewing the above description. The scope of the subject matter should, therefore, be determined with reference to the appended claims, along with the full scope of equivalents to which such claims are entitled.

This written description uses examples to disclose several embodiments of the subject matter, including the best mode, and to enable one of ordinary skill in the art to practice the embodiments of subject matter, including making and using any devices or systems and performing any incorporated methods. The patentable scope of the subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A door lock system comprising:

a first latch assembly comprising a first latch member defining a threaded aperture and configured for pivotal attachment to a first door member;

a second latch assembly comprising a second latch member having a side slot and configured for attachment to a second door member; and a clamp member comprising an elongate shaft and a first flange attached to a first end of the elongate shaft, the elongate shaft having a threaded, second end operably threadedly disposed in the threaded aperture of the first latch member, the clamp member including a second flange attached at or towards the second end of the elongate shaft, wherein an end region adjacent the first end of the elongate shaft is configured to be received in the side slot of the second latch member when the first latch member is pivoted to bring the elongate shaft and second latch member into engagement, wherein one of the first end or the second end of the elongate shaft defines a tool aperture configured to receive a tool head for rotation of the elongate shaft, and the first flange is configured, when the end region is received in the side slot and the elongate shaft is rotated to screw the second end of the elongate shaft into the threaded aperture for the first flange to move towards the second latch member, to come into abutment with the second latch member to connect the elongate shaft, the first latch member, and the second latch member together for securing the first door member with the second door member.

2. The system of claim 1, wherein the second flange is configured to prevent the elongate shaft from being removed from the threaded aperture of the first latch member.

3. The system of claim 1, wherein the side slot of the second latch member extends from an interior region of the second latch member through to an opening in a side of the second latch member, a height of the opening corresponding to a lateral cross-dimension of the elongate shaft, and wherein the second latch member further comprises at least one lip positioned adjacent the opening and defining a clearance dimensioned to interfere with the first flange, to prevent the elongate shaft from being slidably removed from the side slot, when the first flange abuts the second latch member.

4. The system of claim 1, wherein the first latch member comprises a first L-bracket, and the second latch member comprises a second L-bracket, the first L-bracket having a first base plate configured for attachment to the first door member and a first clamp plate attached perpendicularly to the first base plate, the first clamp plate defining the threaded aperture, the second L-bracket having a second base plate configured for attachment to the second door member and a second clamp plate attached perpendicularly to the second base plate, the second clamp plate having the side slot.

5. The system of claim 4, wherein the first latch assembly further comprises a first backer plate and a first fastener unit, the first backer plate configured to abut the first door member and the first fastener unit configured to pivotally attach the first base plate of the first L-bracket to the first backer plate and to attach the first backer plate to the first door member.

6. The system of claim 4, wherein the second latch assembly further comprises a second backer plate and a second fastener unit, the second backer plate configured to abut the second door member and the second fastener unit configured to attach the second base plate of the second L-bracket to the second backer plate and the second backer plate to the second door member.

7. The system of claim 1, further comprising a head attached to the first end or the second end of the elongate shaft that defines the tool aperture, the head having a central pedestal and a rim, wherein the rim extends around and is spaced concentrically away from the central pedestal, the rim and pedestal defining the tool aperture therebetween, wherein a perimeter edge of the tool aperture that is defined by the rim of the head is irregular.

8. The system of claim 1, further comprising one or more sleeves extending around one or more portions of the elongate shaft, the one or more sleeves configured to prevent access to the one or more portions of the elongate shaft disposed within passages of the one or more sleeves.

9. The system of claim 1, further comprising a first guide coupled with the first end or the second end of the elongate shaft that defines the tool aperture, the first guide extending in a direction away from the second latch assembly, the first guide comprising a one or more interior surfaces defining a pocket configured to receive the tool head, the tool aperture being disposed within the pocket.

10. The system of claim 9, further comprising a second guide configured for attachment to the second door member, the second guide including one or more surfaces defining a passage that is linearly aligned with the pocket of the first guide, the tool head configured to extend along the passage of the second guide and be received within the pocket of the first guide for the tool aperture to receive the tool head.

11. A rail vehicle comprising the door lock system of claim 1, the first door member, and the second door member, wherein the first door member and the second door member are adjacent and at least one of the first door member and/or the second door member is configured to be opened and closed for accessing an interior cargo space of the rail vehicle, and wherein the first latch assembly is rotatably attached to the first door member on an exterior of the vehicle and the second latch assembly is attached to the second door member on the exterior of the vehicle.

12. A door lock system comprising:

a first latch assembly comprising a first latch member defining a threaded aperture;

a second latch assembly comprising a second latch member having a side slot, wherein one of the first latch member or the second latch member is configured for pivotal attachment to a first door member and the other of the first latch member or the second latch member is configured for non-pivotal attachment to a second door member;

a clamp member comprising an elongate shaft and a first flange attached to a first end of the elongate shaft, the elongate shaft having a threaded, second end operably threadedly disposed in the threaded aperture of the first latch member, wherein an end region adjacent the first end of the elongate shaft is configured to be received in the side slot of the second latch member when the first latch member or the second latch member is rotated to bring the elongate shaft and second latch member into engagement; and one or more sleeves extending around one or more portions of the elongate shaft, wherein one of the first end or the second end of the elongate shaft defines a tool aperture configured to receive a tool head for rotation of the elongate shaft, and the first flange is configured, when the end region is received in the side slot and the elongate shaft is rotated to screw the second end of the elongate shaft in the threaded aperture for the first flange to move towards the second latch member, to abut the second latch member to connect the elongate shaft, the first latch member, and the second latch member together for securing the first door member with the second door member.

13. The system of claim 12, wherein the clamp member further comprises a second flange coupled with the second end of the elongate shaft, the second flange preventing the elongate shaft from being removed from the threaded aperture of the first latch member.

14. The system of claim 12, wherein the tool aperture is a tamper-resistant tool aperture.

15. The system of claim 12, further comprising a head attached to the first end or the second end of the elongate shaft that defines the tool aperture, the head having a central pedestal and a rim, wherein the rim extends around and is spaced concentrically away from the central pedestal, the rim and pedestal defining the tool aperture therebetween, wherein a perimeter edge of the tool aperture that is defined by the rim of the head is irregular.

16. The system of claim 12, wherein the one or more sleeves are configured to prevent access to the one or more portions of the elongate shaft disposed within passages of the one or more sleeves.

17. The system of claim 12, further comprising a first guide coupled with the first end or the second end of the elongate shaft that defines the tool aperture, the first guide extending in a direction away from the second latch assembly, the first guide comprising a one or more interior surfaces defining a pocket, the tool aperture being disposed within the pocket.

18. The system of claim 17, further comprising a second guide configured for attachment to one of the first door member or the second door member, the second guide including one or more surfaces defining a passage that is linearly aligned with the pocket of the first guide, the tool head configured to extend along the passage of the second guide and be received within the pocket of the first guide for the tool aperture to receive the tool head.

19. A vehicle comprising:

a chassis, a first door member, and a second door member, the first and second door members attached to the chassis, wherein the first door member and the second door member are adjacent and at least one of the first door member and/or the second door member is configured to be opened and closed for accessing an interior cargo space of the vehicle; and one or more lock systems attached to the first and second door members for selectively securing the members at multiple points, wherein each of the one or more lock systems respectively comprises:

a first latch assembly comprising a first latch member having a first L-bracket, the first L-bracket including a first clamp plate defining a threaded aperture;

a second latch assembly comprising a second latch member having a second L-bracket, the second L-bracket including a second clamp plate having a side slot, wherein one of the first latch assembly or the second latch assembly is attached to the first door member and the other of the first latch assembly or the second latch assembly is rotatably attached to the second door member; and a clamp member comprising an elongate shaft and a first flange attached to a first end of the elongate shaft, the elongate shaft having a threaded, second end operably threadedly disposed in the threaded aperture of the first latch member, wherein an end region adjacent the first end of the elongate shaft is configured to be received in the side slot of the second latch member when the first latch assembly or the second latch assembly is rotated to bring the elongate shaft and the second latch member into engagement, wherein the elongate shaft is configured to extend linearly across a portion of the first door member and across a portion of the second door member responsive to the first latch assembly or the second latch assembly being rotated, wherein one of the first end or the second end of the elongate shaft defines a tool aperture configured to receive a tool head for rotation of the elongate shaft, and the first flange is configured, when the end region is received in the side slot and the elongate shaft is rotated to screw the second end of the elongate shaft in the threaded aperture for the first flange to move towards the second latch member, to abut the second latch member to connect the elongate shaft, the first latch member, and the second latch member together for securing the first door member with the second door member.

20. The vehicle of claim 19, wherein the clamp member further comprises a second flange attached at or towards the second end of the elongate shaft, the second flange preventing the elongate shaft from being removed from the threaded aperture of the first latch member.

* * * * *